United States Patent
Horn et al.

(10) Patent No.: US 11,595,150 B2
(45) Date of Patent: Feb. 28, 2023

(54) BOOSTED INDEX MODULATION FOR NONCOHERENT MODULATION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/194,977

(22) Filed: Mar. 8, 2021

(65) Prior Publication Data

US 2021/0336716 A1 Oct. 28, 2021

Related U.S. Application Data

(60) Provisional application No. 63/016,214, filed on Apr. 27, 2020.

(51) Int. Cl.
| | | |
|---|---|---|
| H04W 72/08 | (2009.01) | |
| H04L 1/00 | (2006.01) | |
| H04L 5/00 | (2006.01) | |
| H04W 72/0453 | (2023.01) | |
| H04W 72/12 | (2023.01) | |
| H04W 72/1263 | (2023.01) | |

(52) U.S. Cl.
CPC .......... *H04L 1/0005* (2013.01); *H04L 5/0046* (2013.01); *H04W 72/0453* (2013.01);
(Continued)

(58) Field of Classification Search
CPC ... H04L 1/0005; H04L 5/0046; H04L 1/0016; H04L 1/0003; H04L 1/08; H04L 27/36;
(Continued)

(56) References Cited

U.S. PATENT DOCUMENTS

2015/0373649 A1 12/2015 Tabet et al.
2018/0167932 A1* 6/2018 Papasakellariou .... H04L 1/1861
(Continued)

FOREIGN PATENT DOCUMENTS

| CN | 103731243 A | 4/2014 |
| CN | 110213816 A | 9/2019 |
| WO | WO-2019069168 A1 * | 4/2019 |

OTHER PUBLICATIONS

Cheng et al. "Index Modulation for 5G: Striving to Do More with Less". All pages. (Year: 2017).*

(Continued)

*Primary Examiner* — Brandon M Renner
(74) *Attorney, Agent, or Firm* — Holland & Hart LLP

(57) ABSTRACT

Methods, systems, and devices for wireless communications are described. A transmitting device such as a base station and a user equipment (UE), may segment a set of bits within a transport block into a first subset of bits including modulation bits and a second subset of bits including index modulation bits. The transmitting device may map the first subset of bits to a first set of subcarriers, the second subset of bits to a second set of subcarriers, and an additional set of bits to a third set of subcarriers. The transmitting device may generate a signal according to a boosting factor based on mapping the first subset of bits, the second subset of bits, and the additional set of bits, and transmit the generated signal to a receiving device.

30 Claims, 15 Drawing Sheets

(52) U.S. Cl.
CPC ... *H04W 72/1257* (2013.01); *H04W 72/1263* (2013.01); *H04W 72/1289* (2013.01)

(58) Field of Classification Search
CPC ... H04L 5/0048; H04L 5/0053; H04L 5/0044; H04W 72/0453; H04W 72/1257; H04W 72/1263; H04W 72/1289
See application file for complete search history.

(56) References Cited

U.S. PATENT DOCUMENTS

2019/0123788 A1    4/2019  Park et al.
2020/0077414 A1*   3/2020  Ye .......................... H04L 1/0013

OTHER PUBLICATIONS

Basar E, et al., "IEEE Access Special Section Editorial: Index Modulation Techniques for Next-Generation Wireless Networks," IEEE Access, vol. 6, Jun. 5, 2018 (Jun. 5, 2018), pp. 26452-26456, XP011684957, DOI: 10.1109/ACCESS.2018.2833265 [retrieved on Jun. 4, 2018], p. 26453, col. 1, lines 14-22.
Basar E., "Index Modulation Techniques for 5G Wireless Networks," IEEE Communications Magazine, IEEE Service Center, Piscataway, US, vol. 54, No. 7, Jul. 1, 2016 (Jul. 1, 2016), pp. 168-175, XP011617031, ISSN: 0163-6804, DOI:10.1109/MCOM. 2016.7509396 [retrieved on Jul. 11, 2016], the whole document.
International Search Report and Written Opinion—PCT/US2021/021487—PCT/US2021/021487—ISA/EPO—dated Jul. 8, 2021 (201006WO).

* cited by examiner

Resource Block

| | | | | | | | | | | | |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| . | . | | | | | | | | | | |
| . | . | | | | | | | | | | |
| . | . | | | | | | | | | | |
| $S_{10} * S_{20} * S_{30}$ | $S_{11} * S_{21} * S_{31}$ | . | . | . | | | | | | | |
| $S_{10} * S_{20}$ | $S_{11} * S_{21}$ | . | . | . | | | | | | | |
| $S_{10}$ | $S_{11}$ | . | . | . | | | | | | | |
| 1 | 1 | 1 | 1 | 1 | 1 | 1 | 1 | 1 | 1 | 1 | 1 |

320 — row with $S_{10} * S_{20} * S_{30}$
315 — row with $S_{10} * S_{20}$
310 — row with $S_{10}$
305 — row with 1

FIG. 3A    300-a

Resource Block

| | | | | | | | | | | | |
|---|---|---|---|---|---|---|---|---|---|---|---|
| | | | | | | | | | | | |
| | | | | | | | | | | | |
| | | | | | | | | | | | |
| . | . | | | | | | | | | | |
| . | . | | | | | | | | | | |
| $S_{10} * S_{20} * S_{30}$ | $S_{11} * S_{21} * S_{31}$ | | | | | | | | | | |
| $S_{10} * S_{20} * S_{30}$ | $S_{11} * S_{21} * S_{31}$ | | | | | | | | | | |
| $S_{10} * S_{20}$ | $S_{10} * S_{20}$ | | | | | | | | | | |
| $S_{10} * S_{20}$ | $S_{10} * S_{20}$ | | | | | | | | | | |
| $S_{10}$ | $S_{11}$ | . | . | . | | | | | | | |
| $S_{10}$ | $S_{11}$ | . | . | . | | | | | | | |
| 1 | 1 | . | . | . | | | | | | | |
| 1 | 1 | 1 | 1 | 1 | 1 | 1 | 1 | 1 | 1 | 1 | 1 |

340 — rows with $S_{10} * S_{20} * S_{30}$
335 — rows with $S_{10} * S_{20}$
330 — rows with $S_{10}$
325 — rows with 1

FIG. 3B    300-b

BOOSTED INDEX MODULATION FOR NONCOHERENT MODULATION

CROSS REFERENCE

The present application for patent claims the benefit of U.S. Provisional Patent Application No. 63/016,214 by HORN et al., entitled "BOOSTED INDEX MODULATION FOR NONCOHERENT MODULATION," filed Apr. 27, 2020, assigned to the assignee hereof, and expressly incorporated by reference herein.

FIELD OF TECHNOLOGY

The following relates generally to wireless communications and more specifically to boosted index modulation for noncoherent modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device to boost index modulation for noncoherent modulation. By boosting index modulation for noncoherent modulation, the communication device may reduce impacts of amplified noise related to various modulation schemes, such as differential phase shift keying (DPSK) modulation. The communication device may be configured to apply a boosting factor (e.g., $\sqrt{R}$) to a signal during mapping of the signal to time and frequency resources to increase a signal to noise ratio (SNR) of the signal, where R may be a repetition value for mapping the signal. For example, the communication device may be configured to employ a resource element mapper to apply the boosting factor to subcarriers of the mapped signal to boost the signal.

The communication device may use a noncoherent modulation mapper to modulate input data bits based on an index modulation scheme. For example, the communication device may segment a set of bits within a transport block into a first subset of bit, such as quadrature amplitude modulation (QAM) bits, and a second subset of bits, such as index modulation bits. The communication device may map the QAM bits and the index modulation bits to respective subcarriers, and may generate a signal according to the boosting factor based on mapping the QAM and the index modulation bits. The communication device may also include a number of silent subcarriers (e.g., empty subcarriers) to maintain a total transmitted energy of the generated signal.

Additionally or alternatively, the communication device may be configured with an energy detector for detecting data symbols according to the index modulation mapping. The energy detector may determine a threshold energy for receiving a signal from another communication device, and may demodulate and decode the signal based on the signal satisfying the threshold energy. The energy detector may prevent the communication device from estimating on silent subcarriers transmitted with the boosted subcarriers. The described techniques may, as a result, include features for improvements to wireless communications and, in some examples, may promote enhanced efficiency for high reliability and low latency wireless communications in 5G systems, among other benefits.

A method of wireless communications at a transmitting device is described. The method may include segmenting a set of bits within a transport block into a first subset of bits including modulation bits and a second subset of bits including index modulation bits, the set of bits to transmit to a receiving device, mapping the first subset of bits to a first set of subcarriers, the second subset of bits to a second set of subcarriers, and an additional set of bits to a third set of subcarriers, generating a signal according to a boosting factor based on mapping the first subset of bits, the second subset of bits, and the additional set of bits, and transmitting the generated signal to the receiving device.

An apparatus for wireless communications is described. The apparatus may include a processor, memory coupled with the processor, and instructions stored in the memory. The instructions may be executable by the processor to cause the apparatus to segment a set of bits within a transport block into a first subset of bits including modulation bits and a second subset of bits including index modulation bits, the set of bits to transmit to a receiving device, map the first subset of bits to a first set of subcarriers, the second subset of bits to a second set of subcarriers, and an additional set of bits to a third set of subcarriers, generate a signal according to a boosting factor based on mapping the first subset of bits, the second subset of bits, and the additional set of bits, and transmit the generated signal to the receiving device.

Another apparatus for wireless communications is described. The apparatus may include means for segmenting a set of bits within a transport block into a first subset of bits including modulation bits and a second subset of bits including index modulation bits, the set of bits to transmit to a receiving device, mapping the first subset of bits to a first set of subcarriers, the second subset of bits to a second set of subcarriers, and an additional set of bits to a third set of subcarriers, generating a signal according to a boosting factor based on mapping the first subset of bits, the second subset of bits, and the additional set of bits, and transmitting the generated signal to the receiving device.

A non-transitory computer-readable medium storing code for wireless communications at a transmitting device is described. The code may include instructions executable by a processor to segment a set of bits within a transport block into a first subset of bits including modulation bits and a second subset of bits including index modulation bits, the set of bits to transmit to a receiving device, map the first subset of bits to a first set of subcarriers, the second subset of bits to a second set of subcarriers, and an additional set of bits to a third set of subcarriers, generate a signal according to a boosting factor based on mapping the first subset of bits, the second subset of bits, and the additional set of bits, and transmit the generated signal to the receiving device.

Some examples of the method, apparatuses, and non-transitory computer-readable medium described herein may further include operations, features, means, or instructions for applying the boosting factor to the first subset of bits and the second subset of bits, where mapping the first subset of bits to the first set of subcarriers and the second subset of bits to the second set of subcarriers includes.

Some examples of the method, apparatuses, and non-transitory computer-readable medium described herein may further include operations, features, means, or instructions for identifying the third set of subcarriers as including an empty set, and scaling the third set of subcarriers based on the boosting factor and a total energy of the generated signal.

Some examples of the method, apparatuses, and non-transitory computer-readable medium described herein may further include operations, features, means, or instructions for performing noise coherence estimation for the generated signal using the third set of subcarriers based on scaling the third set of subcarriers.

Some examples of the method, apparatuses, and non-transitory computer-readable medium described herein may further include operations, features, means, or instructions for encoding the set of bits based on the boosting factor, and rate matching the encoded set of bits based on the boosting factor.

In some examples of the method, apparatuses, and non-transitory computer-readable medium described herein, encoding the set of bits may include operations, features, means, or instructions for increasing a rate of the encoding based on the boosting factor.

In some examples of the method, apparatuses, and non-transitory computer-readable medium described herein, the boosting factor includes a square root of a repetition factor.

In some examples of the method, apparatuses, and non-transitory computer-readable medium described herein, the first subset of bits includes a set of quadrature amplitude modulated (QAM) bits.

In some examples of the method, apparatuses, and non-transitory computer-readable medium described herein, mapping the first subset of bits to the first set of subcarriers and the second subset of bits to the second set of subcarriers may include operations, features, means, or instructions for mapping the first subset of bits to the first set of subcarriers and the second subset of bits to the second set of subcarriers based on a location of a data bit in the transport block.

Some examples of the method, apparatuses, and non-transitory computer-readable medium described herein may further include operations, features, means, or instructions for identifying the location of the data bit based on an index modulation scheme associated with the first subset of bits and the second subset of bits.

In some examples of the method, apparatuses, and non-transitory computer-readable medium described herein, the index modulation scheme includes a Gray index modulation scheme.

Some examples of the method, apparatuses, and non-transitory computer-readable medium described herein may further include operations, features, means, or instructions for adding a number of index modulation bits to the second set of subcarriers in accordance with the mapping, where the number of index modulation bits may be based on a logarithmic operation on the boosting factor.

In some examples of the method, apparatuses, and non-transitory computer-readable medium described herein, the logarithmic operation includes a log base 2 of a square root of the boosting factor.

In some examples of the method, apparatuses, and non-transitory computer-readable medium described herein, mapping the modulation bits to the first set of subcarriers and the index modulation bits to the second set of subcarriers further may include operations, features, means, or instructions for scaling a mapping rate based on the modulation bits, a log base 2 of a square root of the boosting factor, a repetition rate, or any combination thereof.

In some examples of the method, apparatuses, and non-transitory computer-readable medium described herein, the generated signal includes a same total energy equal to a second signal generated without the boosting factor.

In some examples of the method, apparatuses, and non-transitory computer-readable medium described herein, the boosting factor may be configured based on a modulation and coding scheme (MCS) value, a constellation mapping configuration, one or more frequency allocation parameters, one or more channel conditions, or any combination thereof.

In some examples of the method, apparatuses, and non-transitory computer-readable medium described herein, the boosting factor may be configured in a downlink control information (DCI) message or a lookup table, or both.

In some examples of the method, apparatuses, and non-transitory computer-readable medium described herein, the boosting factor is configured in a radio resource control (RRC) connection establishment message including a set of parameters indicating the boosting factor.

A method of wireless communications at a receiving device is described. The method may include determining a threshold energy for receiving a signal including a set of subcarriers from a transmitting device, demodulating the signal based on a detected energy of the signal satisfying the threshold energy, demapping the signal to a first subset of subcarriers and a second subset of subcarriers, and decoding the first subset of subcarriers to a number of modulated data bits and the second subset of subcarriers to a number of index modulated data bits based on the demapping.

An apparatus for wireless communications is described. The apparatus may include a processor, memory coupled with the processor, and instructions stored in the memory. The instructions may be executable by the processor to cause the apparatus to determine a threshold energy for receiving a signal including a set of subcarriers from a transmitting device, demodulate the signal based on a detected energy of the signal satisfying the threshold energy, demap the signal to a first subset of subcarriers and a second subset of subcarriers, and decode the first subset of subcarriers to a number of modulated data bits and the second subset of subcarriers to a number of index modulated data bits based on the demapping.

Another apparatus for wireless communications is described. The apparatus may include means for determining a threshold energy for receiving a signal including a set of subcarriers from a transmitting device, demodulating the signal based on a detected energy of the signal satisfying the threshold energy, demapping the signal to a first subset of subcarriers and a second subset of subcarriers, and decoding the first subset of subcarriers to a number of modulated data bits and the second subset of subcarriers to a number of index modulated data bits based on the demapping.

A non-transitory computer-readable medium storing code for wireless communications at a receiving device is described. The code may include instructions executable by a processor to determine a threshold energy for receiving a signal including a set of subcarriers from a transmitting device, demodulate the signal based on a detected energy of the signal satisfying the threshold energy, demap the signal to a first subset of subcarriers and a second subset of subcarriers, and decode the first subset of subcarriers to a number of modulated data bits and the second subset of subcarriers to a number of index modulated data bits based on the demapping.

Some examples of the method, apparatuses, and non-transitory computer-readable medium described herein may further include operations, features, means, or instructions for generating a number of log likelihood ratio values associated with the number of index modulated data bits.

Some examples of the method, apparatuses, and non-transitory computer-readable medium described herein may further include operations, features, means, or instructions for demodulating the first set of subcarriers and the second set of subcarriers based on the detected energy and a location of a number of data bits, determining an outcome of an error check procedure on the number of data bits, and decoding the number of data bits based on the determining.

Some examples of the method, apparatuses, and non-transitory computer-readable medium described herein may further include operations, features, means, or instructions for determining that the detected energy of the signal fails to satisfy the threshold energy, identifying a set of empty subcarriers transmitted with the signal based on the detected energy, and allocating the set of empty subcarriers for noise coherence estimation.

Some examples of the method, apparatuses, and non-transitory computer-readable medium described herein may further include operations, features, means, or instructions for identifying a repetition rate for the received signal, scaling a decoding rate of the first subset of subcarriers and the second subset of subcarriers based on the repetition rate, and decoding the data based on the scaled decoding rate.

In some examples of the method, apparatuses, and non-transitory computer-readable medium described herein, the demapping may include operations, features, means, or instructions for combining data associated with the first subset of subcarriers and the second subset of subcarriers.

In some examples of the method, apparatuses, and non-transitory computer-readable medium described herein, a data bit includes an indication of the signal satisfying the threshold energy.

In some examples of the method, apparatuses, and non-transitory computer-readable medium described herein, a total energy of the signal may be based on a boosting factor.

In some examples of the method, apparatuses, and non-transitory computer-readable medium described herein, a boosting factor may be configured in a DCI message or a lookup table, or both.

In some examples of the method, apparatuses, and non-transitory computer-readable medium described herein, the boosting factor is configured in an RRC connection establishment message including a set of parameters indicating the boosting factor.

BRIEF DESCRIPTION OF THE DRAWINGS

FIGS. 3A and 3B illustrate example resource block configurations that support boosted index modulation for noncoherent modulation in accordance with aspects of the present disclosure.

DETAILED DESCRIPTION

Figure 1:
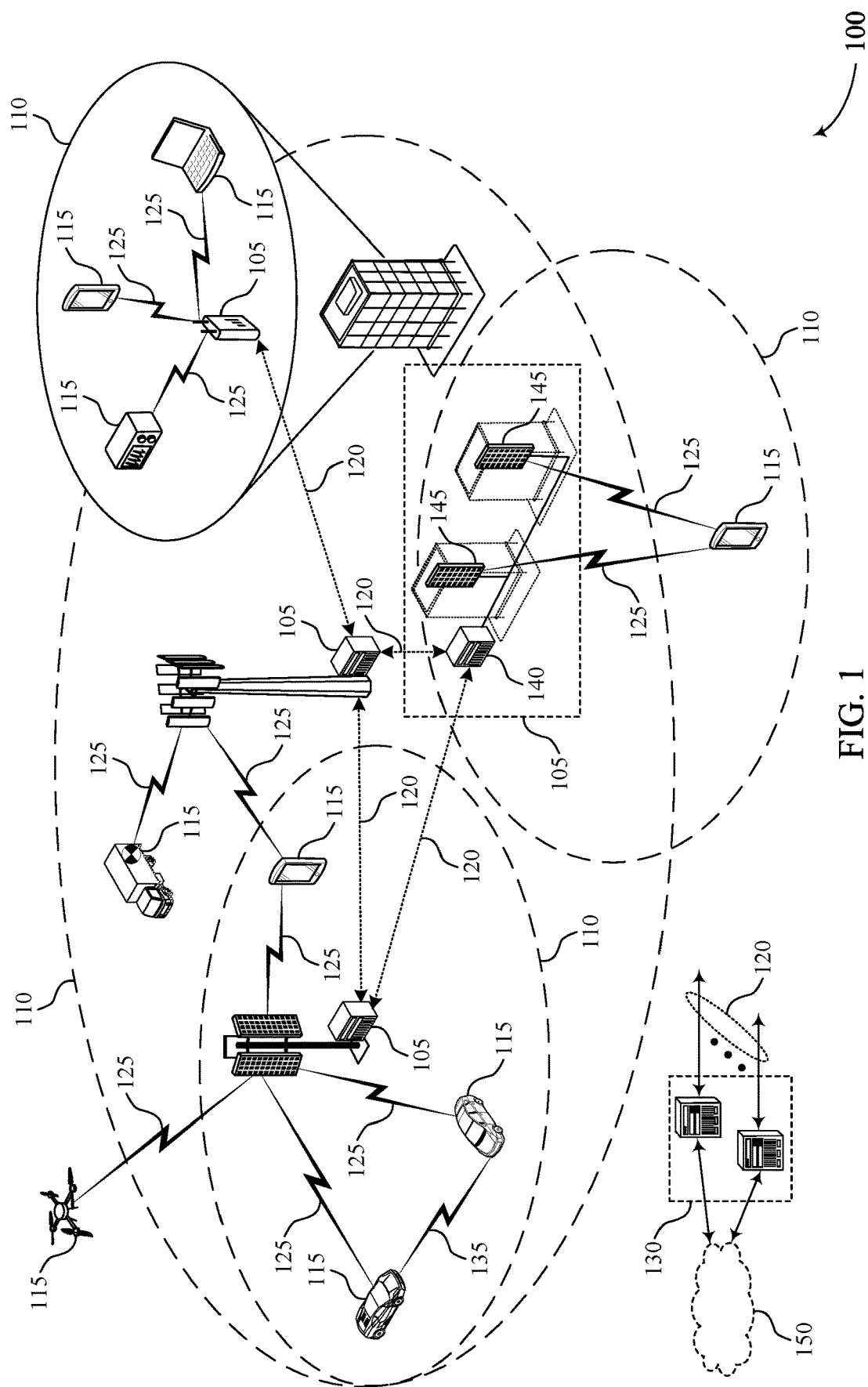
FIGS. 1 and 2 illustrate examples of wireless communications systems that support boosted index modulation for noncoherent modulation in accordance with aspects of the present disclosure.

Some wireless communications systems may include communication devices, such as user equipment (UE) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may support various modulation schemes, such as noncoherent differential phase shift keying (DPSK) modulation, which may be used to increase efficiency and signaling performance. For example, noncoherent DPSK modulation may be used for high reliability and low latency wireless communications, such as in ultra-reliable low latency communications (URLLC). Noncoherent DPSK modulation may also provide the communication devices to bypass coherent channel estimation channel equalization operations.

As part of DPSK modulation, the communication devices may be configured for each subcarrier of a signal to combine data (e.g., data bits, data samples) of a temporally adjacent subcarrier. For example, the communication devices may be configured for each subcarrier to multiply data (e.g., data bits, data samples) of one or more subcarriers, such as a temporally adjacent subcarrier. Multiplying the data of the temporally adjacent subcarrier for each subcarrier may, however, adversely impact the signal. For instance, multiplying adjacent subcarriers during modulation may also multiply or amplify noise associated with the adjacent subcarriers (e.g., resulting in squared noise). In some cases, with low signal-to-noise ratios (SNR), the multiplied noise may affect signaling performance by the communication devices. For example, the communication devices may perform a 1/3 rate encoding such that for each input bit, the encoder may produce 3 output bits.

To reduce the effects of the amplified noise, and in cases with encoding rates lower than 1/3, the communication devices (e.g., when transmitting a signal) may support various techniques to increase SNR, such as signal boosting or repetition of the signal. By way of example, the communication devices may apply a boosting factor at various portions of mapping the signal to time and frequency resources. The boosting factor may be associated with a repetition rate R (e.g., the boosting factor may be $\sqrt{R}$). The communication devices may be configured with a resource element mapper that may apply the boosting factor of $\sqrt{R}$ to subcarriers of the mapped signal to boost the signal. In addition, the rate of rate matching may also be scaled by the same boosting factor.

The communication devices may be configured with a noncoherent modulation mapper, which may modulate input data bits based on an index modulation scheme. The noncoherent modulation mapper may divide input bits into a subset of quadrature amplitude modulation (QAM) data bits and to index modulation bits in serial order. The data location (e.g., the QAM bits) may be modulated based on a Gray index modulation scheme in each resource block, and the index modulation bits may be used to identify locations of the data on resource elements. The segmented QAM and index modulation bits may be mapped to the noncoherent modulation resource block according to the boosting factor and a repetition. For example, the communication devices may repeat a slot of bits R times to increase an SNR. The communication devices may generate an orthogonal frequency division multiplexed (OFDM) signal based on the mapping, and may transmit the signal.

To increase the SNR of the signal by boosting, the communication devices may additionally or alternatively be configured to use a number of silent (e.g., empty) subcarriers along with the boosted subcarriers in a resource block to maintain a total transmitted energy of the signal. The silent (e.g., empty) subcarriers may be used for estimating a noise of the signal (e.g., recurrent neural network (Rnn) estimation). In some examples, the communication devices (e.g., when receiving a signal) may be configured with an energy detector for detecting data symbols according to an index modulation mapping and a repetition or boosting factor. The energy detector may prevent the communication devices from estimating on silent subcarriers transmitted with the boosted subcarriers. In some examples, the communication devices may identify a threshold or maximum energy of the signal using the energy detector to identify subcarriers having data, and subcarriers that do not have data (e.g., silent subcarriers). The communication device may input the identified data symbols to a demodulator, which may demodulate the symbols. The communication devices may use a mapper to combine received QAM data with the index modulation bits, and may estimate the transmitted data bits according to the mapping.

Aspects of the subject matter described in this disclosure may be implemented to realize one or more of the following potential improvements, among others. The techniques employed by the communication devices may provide benefits and enhancements to the operation of the communication devices. For example, operations performed by the communication devices may provide improvements to wireless communications. In some examples, configuring the communication devices to boosted index modulation for noncoherent modulation schemes may support improvements to power consumption, spectral efficiency, and, in some examples, may promote enhanced efficiency for wireless communications operations, among other benefits.

Aspects of the disclosure are initially described in the context of wireless communications systems. For example, aspects of the disclosure are described with respect to communications between transmitting and receiving devices of the wireless communications system. Aspects of the disclosure are further illustrated by and described with reference to apparatus diagrams, system diagrams, and flowcharts including process flow diagrams from both a transmitting device and receiving device perspective that relate to boosted index modulation for noncoherent modulation.

FIG. 1 illustrates an example of a wireless communications system 100 that supports boosted index modulation for noncoherent modulation in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may provide various techniques to increase an SNR of a signal. For example, a base station 105 or a UE 115, or both, may apply a boosting factor $\sqrt{R}$ to a signal during mapping of the signal to time and frequency resources, where R is a repetition value for mapping the signal. The base station 105 or the UE 115, or both, may be configured with a resource element mapper for applying the boosting factor of $\sqrt{R}$ to subcarriers of the signal to boost the signal. In addition, the base station 105 or the UE 115, or both, may use a noncoherent modulation mapper to modulate input data bits based on an index modulation scheme, and may map the data to a resource block based on the index modulation mapping.

The base station 105 or the UE 115, or both, may include silent (e.g., empty) subcarriers to maintain a total transmitted energy of the signal. The silent subcarriers may be used for estimating a noise of the signal. For example, the base station 105 or the UE 115, or both, when receiving a transmitted signal may be configured with an energy detector for detecting data symbols according to an index modulation mapping. The energy detector may prevent the base station 105 or the UE 115, or both, from estimating on the silent subcarriers transmitted with the boosted subcarriers. The base station 105 or the UE 115, or both, may identify a threshold or maximum energy of the transmitted signal using the energy detector to identify subcarriers containing data, and subcarriers that do not contain data (e.g., silent subcarriers). The base station 105 or the UE 115, or both, may demodulate the data signal, and may use the identified silent subcarriers for performing noise estimation of the signal. The wireless communications system 100 may, as a result, include features for improvements to wireless communications between the base stations 105 and the UEs 115 and, in some examples, may promote enhanced efficiency for high reliability and low latency wireless communications in 5G systems, among other benefits.

Figure 2:
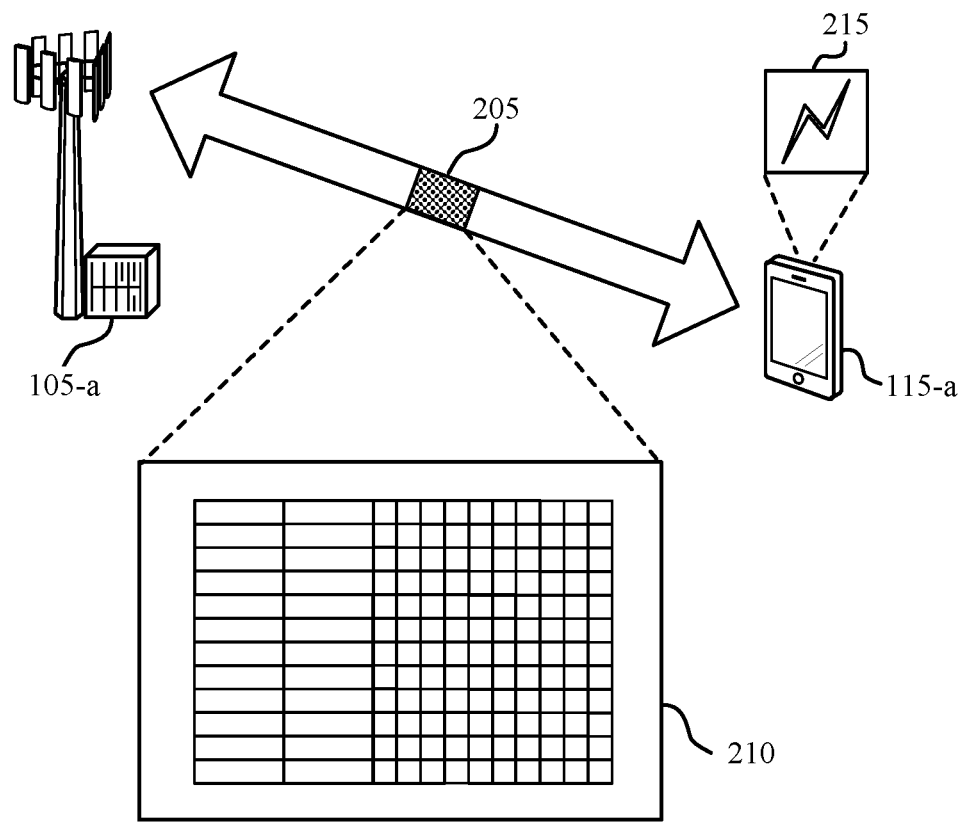

FIG. 2 illustrates an example of a wireless communications system 200 that supports boosted index modulation for noncoherent modulation in accordance with aspects of the present disclosure. The wireless communications system 200 may implement or be implemented by aspects of the wireless communications system 100 or may implement aspects of the wireless communications system 100. For example, the wireless communications system 200 may include a base station 105-a and a UE 115-a, which may be examples of a base station 105 and a UE 115 described herein. The wireless communications system 200 may support multiple radio access technologies including 4G systems such as LTE systems, LTE-A systems, or LTE-A Pro systems, and 5G systems, which may be referred to as NR systems.

The wireless communications system 200 may support various modulation and demodulation schemes, such as noncoherent DPSK modulation. The base station 105-a or the UE 115-a, or both, may use noncoherent DPSK modulation to improve efficiency in the wireless communications system 200. For example, noncoherent DPSK modulation may provide higher reliability and lower latency in physical downlink control channel (PDCCH) URLLC between the base station 105-a and the UE 115-a. In noncoherent DPSK modulation, the base station 105-a or the UE 115-a, or both, may bypass coherent channel estimation and channel equalization.

In the example of FIG. 2, the base station 105-a may be referred to as a transmitting device, while the UE 115-a may be referred to as a receiving device. The base station 105-a may select one or more subcarriers for a signal 205 carrying information (e.g., control information, data) to transmit to the UE 115-a. As part of DPSK modulation, the base station 105-a may combine information (e.g., data) of one or more subcarriers that are adjacent in a time domain to the one or more selected subcarriers for the signal 205. For example, the base station 105-a may multiply information (e.g., data) of one or more temporally adjacent subcarriers for each of the one or more selected subcarriers for the signal 205. In some examples, as part of DPSK modulation, portions of the signal 205 may be used as a reference, thereby eliminating demand for an additional reference signal. As a result, the UE 115-a may use less resources for processing the signal 205, and as a result experience power saving.

The base station 105-a may increase a reliability of the DPSK modulation by using a symbol repetition for the signal 205. An output of a modulator of the base station 105-a, based in part on the symbol repetition, may be given by Equation (1):

$$x_{R\cdot k} = x_{R\cdot k-1}s_k, k \geq 0 \qquad (1)$$
$$x_{R\cdot k+1} = x_{R\cdot k+i-1} R > i \geq 1, k \geq 0$$
$$x_{-1} = 1$$

where $s_k$ represents a data symbol and $x_{R\cdot k}$ represents a modulated signal associated with a given repetition factor R. The data symbol $s_k$ may be multiplied by an adjacent subcarrier $x_{R\cdot k-1}$ (e.g., a temporally adjacent subcarrier) as part of the DPSK modulation. Multiplying the adjacent subcarriers during modulation may also multiply (or amplify) a noise associated with the adjacent subcarriers, and thereby influencing processing of the signal 205.

To reduce unfavorable effects of the amplified noise, the base station 105-a may be configured to increase an SNR of the signal 205, for example, by boosting the signal 205 or repetition of the signal 205. The base station 105-a may boost the signal 205 by applying a boosting factor to various portions of mapping the one or more subcarriers associated with the signal 205. For example, the base station 105-a may apply a boosting factor to various portions of mapping the one or more subcarriers in a resource block 210 associated with the signal 205. The boosting factor may be associated with a repetition rate R (e.g., $\sqrt{R}$).

The boosting factor may be an integer value (e.g., in cases where a corresponding coding rate is smaller than 1). The boosting factor may be predefined or configured according to various aspects in a lookup table. For example, the boosting factor may, in some examples, be configured according to various factors. In some examples, the boosting factor may be configured according to a modulation and coding scheme (MCS) value (e.g., where each MCS may have associated repetition factors). In some other examples, the boosting factor may be configured according to a constellation used for mapping data bits (e.g., BPK, QPSK, DPSK, etc.), or for a given frequency allocation of the signal 205. In other examples, the boosting factor may be configured according to channel conditions (e.g., a delay spread, a Doppler spread, a time offset, etc.

The base station 105-a may also be configured to convey boosting factor information to the UE 115-a in a control message, such as in a downlink control information (DCI) message. Alternatively or additionally, the UE 115-a may be configured with a lookup table, which the UE 115-a may use to identify a boosting factor. In some other examples, the base station 105-a may be configured to transmit an RRC connection establishment message including a set of parameters indicating the boosting factor (e.g., per MCS). The UE 115-a may receive the RRC connection establishment message including the set of parameters indicating the boosting factor. This may reduce the DCI overhead in the price of less flexibility. That is, in some cases, the default configuration desired boosting may be changed during time according to a delay spread or a Doppler spread. As such, the base station 105-a may transmit, and the UE 115-a may receive, the DCI including the boosting factor. In some cases where the channel does not change rapidly (e.g., relative to a threshold or baseline rate) the base station 105-a may transmit a vector of boosting factors per MCS which can be changed by RRC or MAC-CE messages.

To increase the SNR of the signal 205 by boosting, the base station 105-a may use a number of silent (e.g., empty) subcarriers along with the boosted subcarriers in the resource block 210 to maintain a total transmitted energy of the signal 205. The boosted signal 205 may be distributed across a number of boosted subcarriers, or the boosted signal 205 may be mapped to a single boosted subcarrier, each boosting scheme corresponding to a number of silent subcarriers which maintain a total energy of the original signal (e.g., a non-boosted signal). To transmit on the silent or empty subcarriers, the base station 105-a may scale a coding rate by a factor of R. For example, fewer subcarriers carrying data may increase the rate. The empty subcarriers may be used for estimating noise (e.g., Rnn estimation). The base station 105-a may generate the boosted signal 205 by applying the boosting factor of $\sqrt{R}$ to the signal 205 via a resource element mapper. For example, the resource element mapper may apply the boosting factor to one or more subcarriers of the resource block 210 to boost the signal 205. Similarly, the base station 105-a may scale a rate associated with rate matching by the boosting factor.

The base station 105-a may be configured with a noncoherent modulation mapper, which may modulate input data bits based on an index modulation scheme. The base station 105-a may, using the noncoherent modulation mapper, divide input bits into a subset of QAM data bits and to index modulation bits sequentially. Data location (e.g., location of QAM bits) may be modulated based on a Gray index modulation scheme. The index modulation bits may identify the location of the data on resource elements in the resource block 210. The base station 105-a may map the segmented QAM and index modulation bits to the resource block 210 according to the boosting factor and a repetition. For example, the base station 105-a may implement a repetition associated with the mapping, and the base station 105-a may repeat a slot of bits R times to increase the signal 205 margin (e.g., increase the strength of signal 205 and SNR). For instance, symbols may be repeated R times when coding across R subcarriers, with a coding rate of 1/R. Accordingly, the base station 105-a may generate an OFDM signal based on the mapping of the boosted subcarriers, and the OFDM signal may be boosted according to the boosted subcarriers.

The UE 115-a may receive the signal 205 from the base station 105-a. In some examples, the UE 115-a may be configured with an energy detector 215 for detecting data symbols according to tan index modulation mapping and a repetition or boosting factor. The energy detector 215 may, in some cases, prevent the UE 115-a from attempting to estimate on silent subcarriers transmitted with boosted subcarriers. The UE 115-a may use the energy detector 215 to identify subcarriers carrying data, and subcarriers that do not carry data (e.g., silent subcarriers) based on an energy (e.g., a maximum energy) of the received signal 205 and the index modulation. The UE 115-a may input the identified data symbols to a demodulator, which may demodulate the symbols and a mapper may combine received QAM data with the index modulation bits, and may estimate the transmitted data bits according to the mapping. The UE 115-a may implement various error checking schemes or may utilize iterative decoding to increase a reliability of the received data.

The base station 105-a and the UE 115-a may, as a result, include features for improvements to wireless communications between the base station 105-a and the UE 115-a and, in some examples, may promote enhanced efficiency for high reliability and low latency wireless communications in 5G systems, among other benefits. Although aspects of transmitting the signal 205 were described from the perspective of the base station 105-a, the UE 115-a may be configured to perform same or similar operations (or configured with same or similar components) for transmitting the signal 205. Likewise, although aspects of receiving the signal 205 were described from the perspective of the UE 115-a, the base station 105-a may be configured to perform same or similar operations (or configured with same or similar components) for receiving the signal 205.

FIG. 3A illustrates an example resource block configuration 300-a that supports boosted index modulation for noncoherent modulation in accordance with aspects of the present disclosure. The resource block configuration 300-a may implement or be implemented by aspects of the wireless communications systems 100 and 200 or may implement aspects of the wireless communications systems 100 and 200 as described with reference to FIGS. 1 and 2, respectively. For example, the resource block configuration 300-a may be based on a configuration provided by a base station 105 and implemented by the base station 105 or a UE 115, or both. The base station 105 or the UE 115, or both, may support wireless communications using the resource block configuration 300-a. For example, the base station 105 or the UE 115, or both, may map information (e.g., control information, data) for wireless communications according to the resource block configuration 300-a.

In the example of FIG. 3A, the resource block configuration 300-a may correspond to a noncoherent resource block including a number of resource elements. The base station 105 or the UE 115, or both, may map subcarriers to resource elements in the noncoherent resource block. A first row 305 in the noncoherent resource block may include known data (e.g., 1). A second row 310 in the noncoherent resource block may include subcarriers $s_{10}$ and $s_{11}$ according to a mapping. A third row 315 in the noncoherent resource block may include mapped data subcarriers, where adjacent subcarriers are multiplied according to a mapping configuration (e.g., $s_{10}*s_{11}$ and $s_{11}*s_{21}$). A fourth row 320 in the noncoherent resource block may include additional mapped data subcarriers, where adjacent subcarriers are multiplied according to a mapping configuration (e.g., $s_{10}*s_{20}*s_{30}$ and $s_{11}*s_{21}*s_{31}$). Therefore, the base station 105 or the UE 115, or both, may be configured to use adjacent subcarriers in the resource block for wireless communications of signals, and the adjacent subcarriers may use a same communication channel.

FIG. 3B illustrates an example resource block configuration 300-b that supports boosted index modulation for noncoherent modulation in accordance with aspects of the present disclosure. The resource block configuration 300-b may implement or be implemented by aspects of the wireless communications systems 100 and 200 or may implement aspects of the wireless communications systems 100 and 200 as described with reference to FIGS. 1 and 2, respectively. For example, the resource block configuration 300-b may be based on a configuration provided by a base station 105 and implemented by the base station 105 or a UE 115, or both. The base station 105 or the UE 115, or both, may support wireless communications using the resource block configuration 300-b. For example, the base station 105 or the UE 115, or both, may map information (e.g., control, data) for wireless communications according to the resource block configuration 300-b.

In the example of FIG. 3B, the base station 105 or the UE 115, or both, may map information (e.g., control information, data) for wireless communications according to the resource block configuration 300-b. For example, the base station 105 or the UE 115, or both, may map data to resource elements of a resource block, each mapping operation may be repeated according to a repetition rate. For example, the base station 105 or the UE 115, or both, may map data to the resource block according to a repetition factor of R=2, where each row is repeated twice in the resource block. A first row, in the resource block, may include known data (e.g., 1) and may be repeated for a repetition 325. A second row, in the resource block, may include a first mapped subcarrier and a second mapped subcarrier ($s_{10}$ and $s_{11}$) and may be repeated for a repetition 330. A third row, in the resource block, may include two multiplied adjacent subcarriers and may be repeated for a repetition 335 ($s_{10}*s_{20}$). A repetition 340 may include further multiplication of adjacent subcarriers ($s_{10}*s_{20}*s_{30}$). Therefore, the base station 105 or the UE 115, or both, may be configured to use adjacent subcarriers in the resource block for wireless communications of signals, and the adjacent subcarriers may use a same communication channel.

Figure 4:
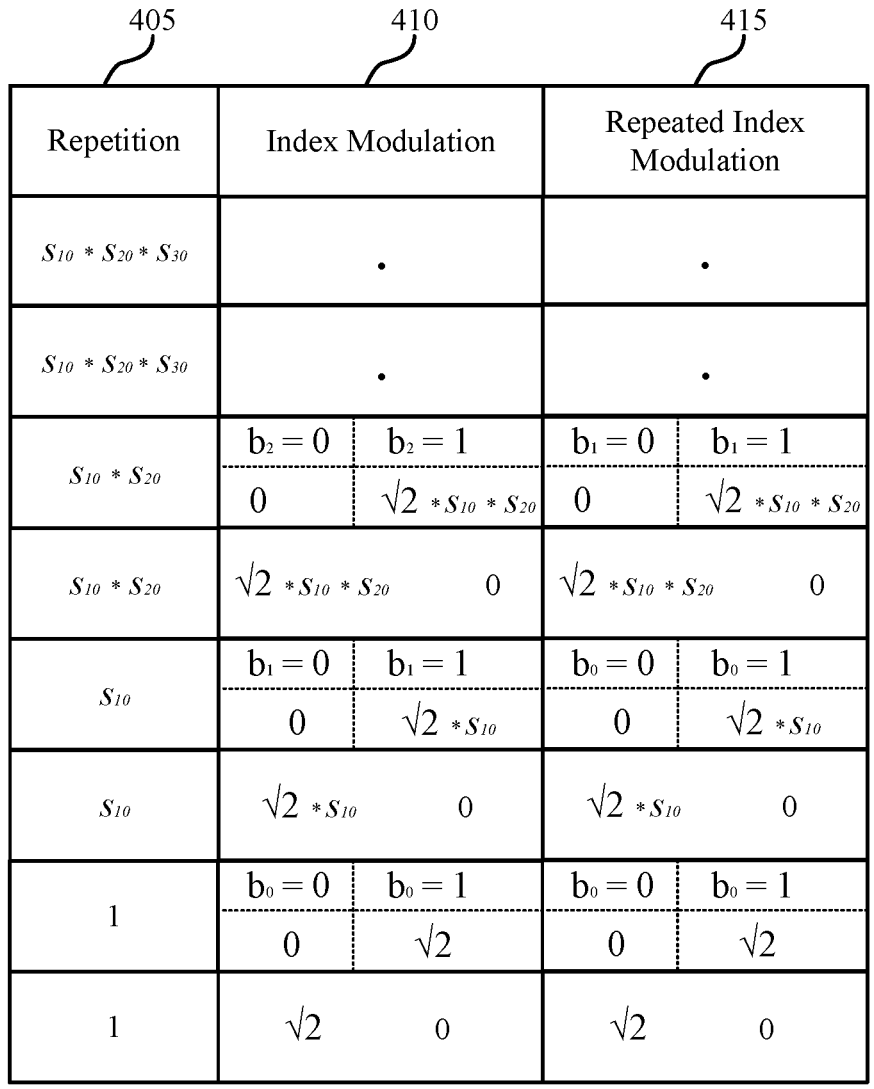
FIG. 4 illustrate example noncoherent mapping configurations that support boosted index modulation for noncoherent modulation in accordance with aspects of the present disclosure.

FIG. 4 illustrates an example of a noncoherent mapping configuration 400 that supports boosted index modulation for noncoherent modulation in accordance with aspects of the present disclosure. The noncoherent mapping configuration 400 may implement or be implemented by aspects of wireless communications systems 100 and 200 or may implement aspects of the wireless communications systems 100 and 200 as described with reference to FIGS. 1 and 2, respectively. For example, the noncoherent mapping configuration 400 may be based on a configuration provided by a base station 105 and implemented by the base station 105 or a UE 115, or both. The noncoherent mapping configuration 400 may support repetition, index modulation, repeated index modulation, etc. The base station 105 or the UE 115, or both, may thereby support wireless communications using the noncoherent mapping configuration 400.

The base station 105 or the UE 115, or both, map information bits (e.g., control bits, data bits) to time and frequency resources of a resource block. According to a repetition configuration 405, the base station 105 or the UE 115, or both, may the information bits to a subcarrier of the resource block, and may repeat the mapping of the information bits to one or more additional subcarriers based on the repetition factor. For example, for a repetition value of two (e.g., R=2), the base station 105 or the UE 115, or both, may map the information bits to a first subcarrier and may repeat the mapping on a separate resource element based on the repetition (e.g., $s_{10}$ is mapped twice based on the repetition R=2). In some examples, according to a noncoherent mapping, the base station 105 or the UE 115, or both, may multiply adjacent subcarriers (e.g., $s_{10}*s_{20}$ and $s_{10}*s_{20}*s_{30}$), map the multiplied subcarriers to a resource element of the resource block, and repeat the mapping based on the repetition factor.

According to an index modulation mapping configuration 410, the base station 105 or the UE 115, or both, may segment a set of information bits (e.g., input bits) into a subset of index modulation bits (e.g., $b_0$, $b_1$, $b_2$) and a subset of QAM bits. The base station 105 or the UE 115, or both, may map the index modulation bits (e.g., $b_0$, $b_1$, $b_2$) and the QAM bits to one or more subcarriers in the resource block, for example, according to a boosting factor (e.g., $\sqrt{R}$) and to an identified repetition value (e.g., $\sqrt{2}$, $\sqrt{2}*s_{10}$, $\sqrt{2}*s_{10}*s_{20}$). For example, the base station 105 or the UE 115, or both, may map a first set of the QAM bits to a first set of subcarriers on a resource element associated with the resource block. In some cases, the subcarriers may be boosted according to the boosting factor (e.g., $\sqrt{2}$), and the mapping may include a number of silent subcarriers (e.g., 0) mapped to a same resource element to preserve a total energy of a signal. In some cases, the number of silent subcarriers may be used for noise coherence (e.g., Rnn estimation).

The base station 105 or the UE 115, or both, may map a number of index modulation bits to the resource element associated with the resource block, which may identify a location of the boosted subcarrier on the resource element. For example, an index modulation bit having a value of 0 may indicate a silent subcarrier, and an index modulation bit having a value of 1 may indicate a QAM data. In some cases, the base station 105 or the UE 115, or both, may apply a first set of index modulation bits to a first repetition of mapped data, a second set of index modulation bits to a second repetition of mapped data, and so on. According to a repeated index modulation mapping configuration 415, the base station 105 or the UE 115, or both, may apply a first set of index modulation bits to a first repetition of mapped data, and may repeat the use of the first set of index modulation bits for a second repetition of mapped data, where the application of the index modulation bits may be based on repeated index modulation of the index modulation bits. The base station 105 or the UE 115, or both, may promote enhanced efficiency for high reliability and low latency wireless communications in 5G systems, among other benefits using the noncoherent mapping configuration 400.

Figure 5:
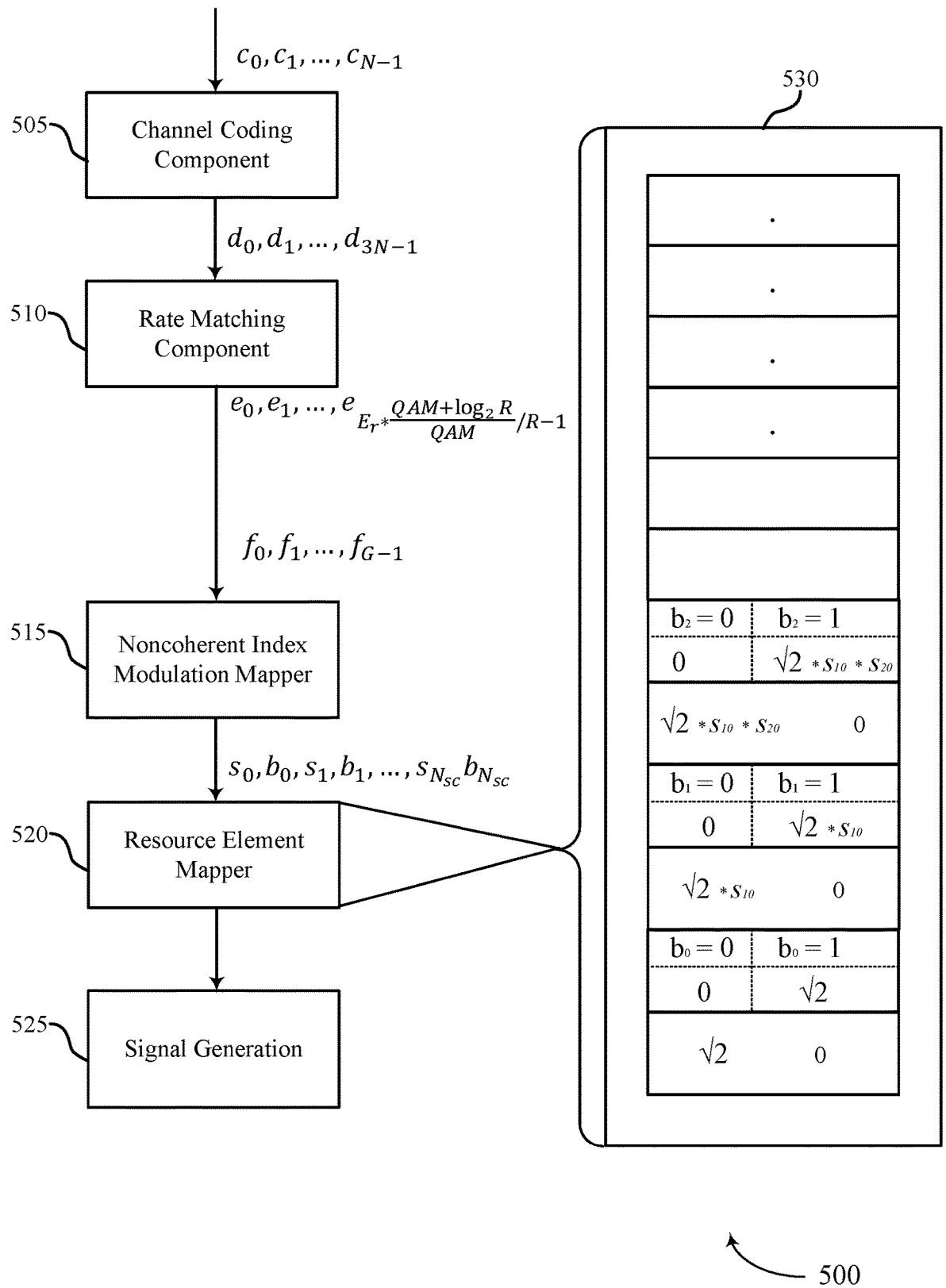
FIGS. 5 and 6 illustrate examples of methods that support boosted index modulation for noncoherent modulation in accordance with aspects of the present disclosure.

FIG. 5 illustrates an example of a method 500 that supports boosted index modulation for noncoherent modulation in accordance with aspects of the present disclosure. The method 500 may implement or be implemented by aspects of the wireless communications systems 100 and 200 or may implement aspects of the wireless communications systems 100 and 200 as described with reference to FIGS. 1 and 2, respectively. For example, the operations of method 500 may be implemented by a transmitting device (e.g., a base station 105, a UE 115) or its components as described herein. For example, the operations of method 500 may be performed by a communications manager as described with reference to FIGS. 7 through 10. In some examples, a transmitting device (e.g., a base station 105, a UE 115) may execute a set of instructions to control the functional elements of the device to perform the functions described herein. Additionally or alternatively, a transmitting device (e.g., a base station 105, a UE 115) may perform aspects of the functions described herein using special-purpose hardware.

A transmitting device may be configured with a resource element mapper. The resource element mapper may be implemented in hardware, code (e.g., software or firmware) executed by a processor, or any combination thereof. If implemented in code executed by a processor, the functions of the resource element mapper may be executed by a general-purpose processor, a DSP, an ASIC, an FPGA or other programmable logic device, discrete gate or transistor logic, discrete hardware components, or any combination thereof designed to perform the functions described in the present disclosure. The resource element mapper may create a boosted signal by applying a boosting factor based on a repetition rate R. In some cases, the boosting factor may be predefined.

The resource element mapper may apply a boosting factor $\sqrt{R}$ to boost the signal. The resource element mapper may apply the boosting factor to one or more subcarriers of a resource block to boost the signal. To maintain a same total transmitted energy of the signal (e.g., a same energy as a non-boosted signal), the resource element mapper may include a number of silent subcarriers along with the boosted subcarriers. For noncoherent modulation, the silent or empty subcarriers may also be used to estimate noise (e.g., Rnn estimation). The rate of rate matching may be scaled by the boosting factor. For example, for R=2, the transmitting device may use half of the original subcarriers to transmit the signal. In such examples, the resource block size might not change, and a total number of information bits (e.g., data bits) may also be the same, which may increase the rate according to the repetition factor used (e.g., the rate may be twice what it was before the repetition).

The transmitting device may be configured with a noncoherent modulation mapper, which may modulate information bits (e.g., input data bits) based on an index modulation. The noncoherent modulation mapper may be implemented in hardware, code (e.g., software or firmware) executed by a processor, or any combination thereof. If implemented in code executed by a processor, the functions of the noncoherent modulation mapper may be executed by a general-purpose processor, a DSP, an ASIC, an FPGA or other programmable logic device, discrete gate or transistor logic, discrete hardware components, or any combination thereof designed to perform the functions described in the present disclosure. The noncoherent modulation mapper may divide a number of information bits (e.g., input data bits) into a subset of QAM data bits and to index modulation bits in serial order. A data location (e.g., QAM bits) may be modulated based on a Gray index modulation scheme in each block of R subcarriers. The Gray index modulation may increase a decoding efficiency by decreasing a distance between mapped bits.

The index modulation bits may identify the location of the data on the resource element. For example, in cases where R=2, the information bits (e.g., input data bits) may be located at one of two locations (e.g., 1 subcarrier of 2 subcarriers). In such examples, the index modulation bits may be mapped to one subcarrier to indicate the location of the data, and another subcarrier may be empty. In other cases, for example, for R=4, data may be located at one of four locations on the resource block, with index modulation bits indicating the location of data at the two locations. In some examples, $\log_2 R$ bits may be added per R subcarriers based on the index modulation, which may scale the rate to $r_{new}$ according to:

$$r_{new} = r_{old} \frac{QAM}{QAM + \log_2 R} \cdot R \qquad (2)$$

where $r_{old}$ is a rate before an addition of bits based on index modulation, and QAM is a number of QAM bits.

At 505, the transmitting device may encode, at a channel coding component, information bits $c_0, c_1, \ldots, c_{N-1}$, where N is a total number of information bits. The channel coding component may be implemented in hardware, code (e.g., software or firmware) executed by a processor, or any combination thereof. If implemented in code executed by a processor, the functions of the channel coding component may be executed by a general-purpose processor, a DSP, an ASIC, an FPGA or other programmable logic device, discrete gate or transistor logic, discrete hardware components, or any combination thereof designed to perform the functions described in the present disclosure.

In some examples, the transmitting device may encode the information bits based on a boosting factor R to generate encoded bits $d_0, d_1, \ldots, d_{3N-1}$. At 510, the transmitting device may rate match, via a rate matching component, the encoded bits $d_0, d_1, \ldots, d_{3N-1}$. In some examples, the channel coding component may perform a 1/3 rate encoding. For example, for every single information bit, the channel coding component may generate three encoded bits. The rate matching component may be implemented in hardware, code (e.g., software or firmware) executed by a processor, or any combination thereof. If implemented in code executed by a processor, the functions of the rate matching component may be executed by a general-purpose processor, a DSP, an ASIC, an FPGA or other programmable logic device, discrete gate or transistor logic, discrete hardware components, or any combination thereof designed to perform the functions described in the present disclosure. During rate matching, the bits are rate matched according to a coding rate $E_r$, which may be scaled by the boosting factor R and the number of QAM bits. For example, the coding rate for the input bits may be scaled by $$E_r \cdot \frac{QAM + \log_2 R}{QAM} R - 1.$$

After rate matching, the bits may be denoted $$e_0, e_1, \ldots, e_{E_r \cdot \frac{QAM + \log_2 R}{QAM} / R - 1}.$$

The boosting factor may be applied to the rate matched bits, and the boosted rate matched bits (denoted $f_0, f_1, \ldots, f_{G-1}$, where G is the total number of coded bits).

At 515, the transmitting device may segment, via a noncoherent modulation mapper, the input bits $f_0, f_1, \ldots, f_{G-1}$, into a subset of QAM data bits and to index modulation bits in serial order denoted $s_0, b_0, s_1, b_1, \ldots, s_{N_{sc}} b_{N_{sc}}$, where $N_{sc}$ is the number of subcarriers in each OFDM symbol. The data location (e.g., the QAM bits) may be modulated based on a Gray index modulation scheme in each block of R sub carriers. The index modulation bits may identify the location of the data on the resource element. For example, in cases where R=2, the data bit may be located at one of two locations (e.g., 1 subcarrier of 2 subcarriers). In such examples, the index modulation bit may be mapped to one subcarrier to indicate the location of the data, and another subcarrier may be silent (e.g., empty) for noise estimation.

At 520, the transmitting device may map, via a resource element mapper, the segmented bits QAM and index modulation bits $s_0, b_0, s_1, b_1, \ldots, s_{N_{sc}} b_{N_{sc}}$ to a noncoherent modulation resource block 530 according to the boosting factor and a repetition R=2. The number of data bits $s_i$ may be mapped according to the index modulation bits $b_j$, where the index modulation bits identify the location of the data on the mapped resource element. At 525, the transmitting device may generate an OFDM signal based on the mapping, where the OFDM signal is boosted according to the boosted subcarriers.

Figure 6:
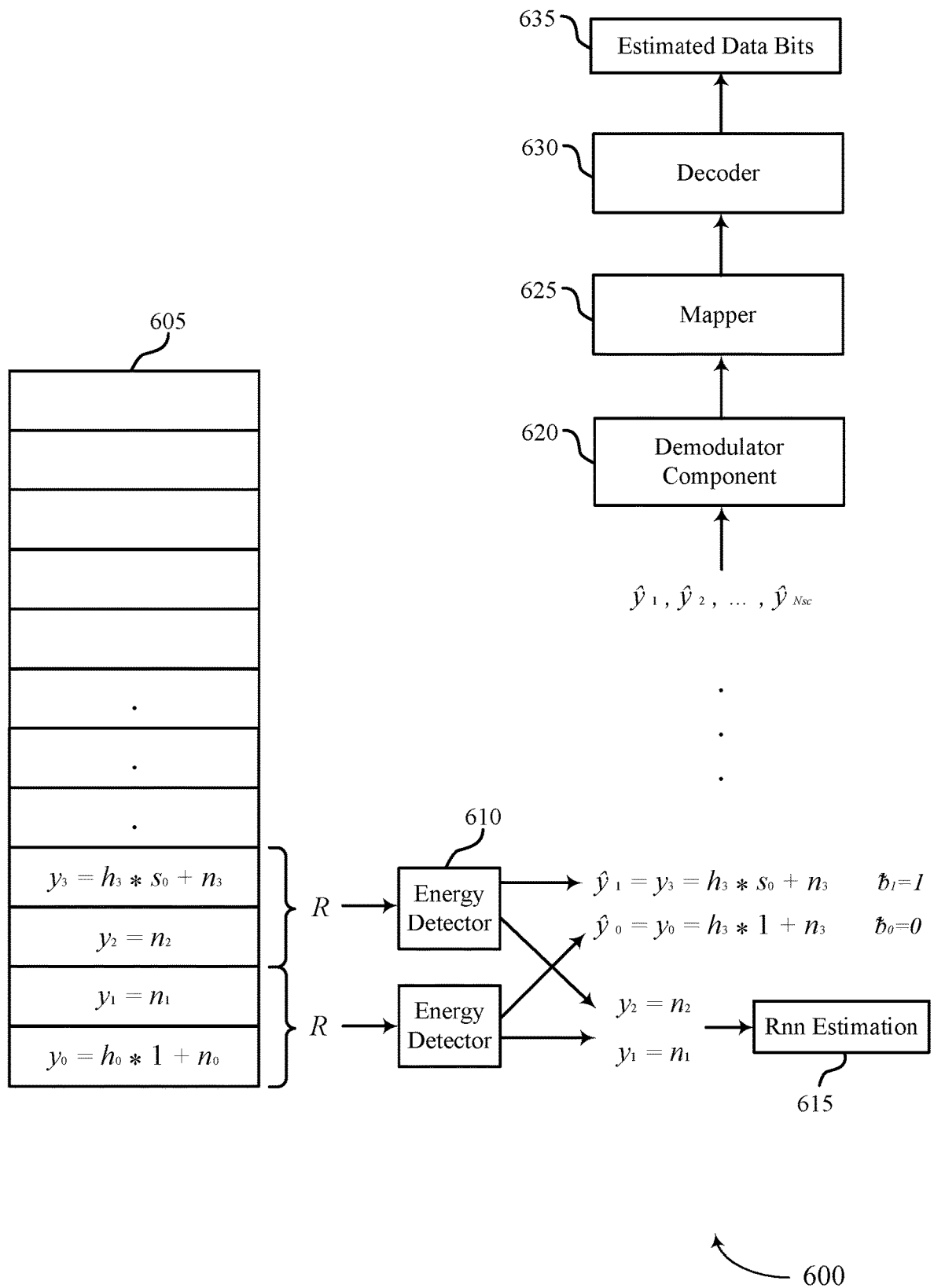

FIG. 6 illustrates an example of a method 600 that supports boosted index modulation for noncoherent modulation in accordance with aspects of the present disclosure. The method 600 may implement or be implemented by aspects of the wireless communications systems 100 and 200 or may implement aspects of the wireless communications systems 100 and 200 as described with reference to FIGS. 1 and 2, respectively. For example, the operations of method 600 may be implemented by a receiving device (e.g., a base station 105, a UE 115) or its components as described herein. For example, the operations of method 600 may be performed by a communications manager as described with reference to FIGS. 7 through 10. In some examples, a receiving device (e.g., a base station 105, a UE 115) may execute a set of instructions to control the functional elements of the device to perform the functions described herein. Additionally or alternatively, a receiving device (e.g., a base station 105, a UE 115) may perform aspects of the functions described herein using special-purpose hardware.

A receiving device may be configured with an energy detector for detecting one or more symbol locations with a detected energy that satisfies a threshold energy (e.g., a maximum energy detector). For example, the energy detector may detect one or more symbol locations based on a detected SNR satisfying 0 decibels (dB). In some cases, the energy detector may prevent the receiving device from estimating a channel condition, or the like, on silent subcarriers transmitted on boosted subcarriers. The energy detector may be implemented in hardware, code (e.g., software or firmware) executed by a processor, or any combination thereof. If implemented in code executed by a processor, the functions of the energy detector may be executed by a general-purpose processor, a DSP, an ASIC, an FPGA or other programmable logic device, discrete gate or transistor logic, discrete hardware components, or any combination thereof designed to perform the functions described in the present disclosure.

The receiving device may receive information 605 (e.g., samples) from a transmitting device. The received information 605 (e.g., samples) may correspond to a boosting factor and a repetition R. The receiving device may, in some examples, receive boosted subcarriers and silent subcarriers carrying the information 605 (e.g., samples) transmitted from the transmitting device. At 610, the receiving device may receive, at an energy detector, one or more signals carrying the information 605 (e.g., samples). The one or more signals may be associated with a repetition R. The energy detector may identify subcarriers carrying data, and subcarriers that do not carry data (e.g., silent subcarriers) based on a maximum energy of the received signals and an index modulation. For example, transmitting device may, via the energy detector, detect a maximum energy of a signal and a corresponding index modulation bits $\tilde{b}_1=1$ and $\tilde{b}_0=0$ identifying the location of the data $\tilde{y}_1=y_3=h_3^*s_0+n_3$ and $\tilde{y}_0=y_0=h_3^*1+n_3$. The energy detector may also identify the silent subcarriers (associated with symbols $y_2=n_2$ and $y_1=n_1$), and may allocate the silent subcarriers for noise coherence estimation (e.g., Rnn estimation $\tilde{R}_{nn}$), which the receiving device may perform at 615.

At 620, the receiving device may, via the demodulator component, demodulate the symbols $\tilde{y}_0, \tilde{y}_1, \ldots, \tilde{y}_{N_{sc}}$ (identified by the energy detector) into a subset including data subcarriers $\hat{s}_0, \hat{s}_1, \ldots, \hat{s}_{N_{sc}}$ and a subset including subcarriers containing index modulation bits $\hat{b}_0, \hat{b}_1, \ldots, \hat{b}_{N_{sc}}$. In some cases, the demodulator component may multiply adjacent subcarriers and may output an estimation of the signal. At 625, the receiving device may, via a mapper, combine the QAM data with the location data (e.g., the index modulation bits) $\hat{s}_0, \hat{b}_0, \hat{s}_1, \hat{b}_1, \ldots, \hat{s}_{N_{sc}}, \hat{b}_{N_{sc}}$. In some examples, a number of log-likelihood bits may be generated according to the number of identified index modulation bits.

At 630, the receiving device may decode, via a decoder, the combined QAM data with the location data, and at 635 the receiving device may estimate the received data bits. In some cases, the receiving device may be configured to use an iterative decoding process based on an error checking process, for example, in cases with a large number of bits and a smaller decoding rate. The iterative decoding process may include identifying the data locations based on the index modulation bits, demodulating the data with the given locations, and performing an error check procedure (e.g., CRC) on the data. In cases where the data does not pass an error check, the receiving device may repeat the process on block codes that did not pass CRC by choosing the second highest energy on blocks with small data LLRs.

In some other examples, an SNR of the signal may be low after decoding, and the energy detector used to identify the location of the index modulation bit has a high block error rate (BLER), which may damage performance of the receiver. To improve reception of the signal, index modulation may be used in each block of R sub carriers, and repetitions may be applied over a number L blocks to increase the performance of the detector. The repetition over L blocks may scale the rate to $r_{new}$ according to:

$$r_{new} = r_{old} \frac{QAM}{QAM + \frac{\log_2 R}{L}} \cdot R$$

where $r_{old}$ is the rate before the addition of the bits based on index modulation, and QAM is the number of QAM bits. In such cases less transmitted bits may increase the rate.

Figure 7:
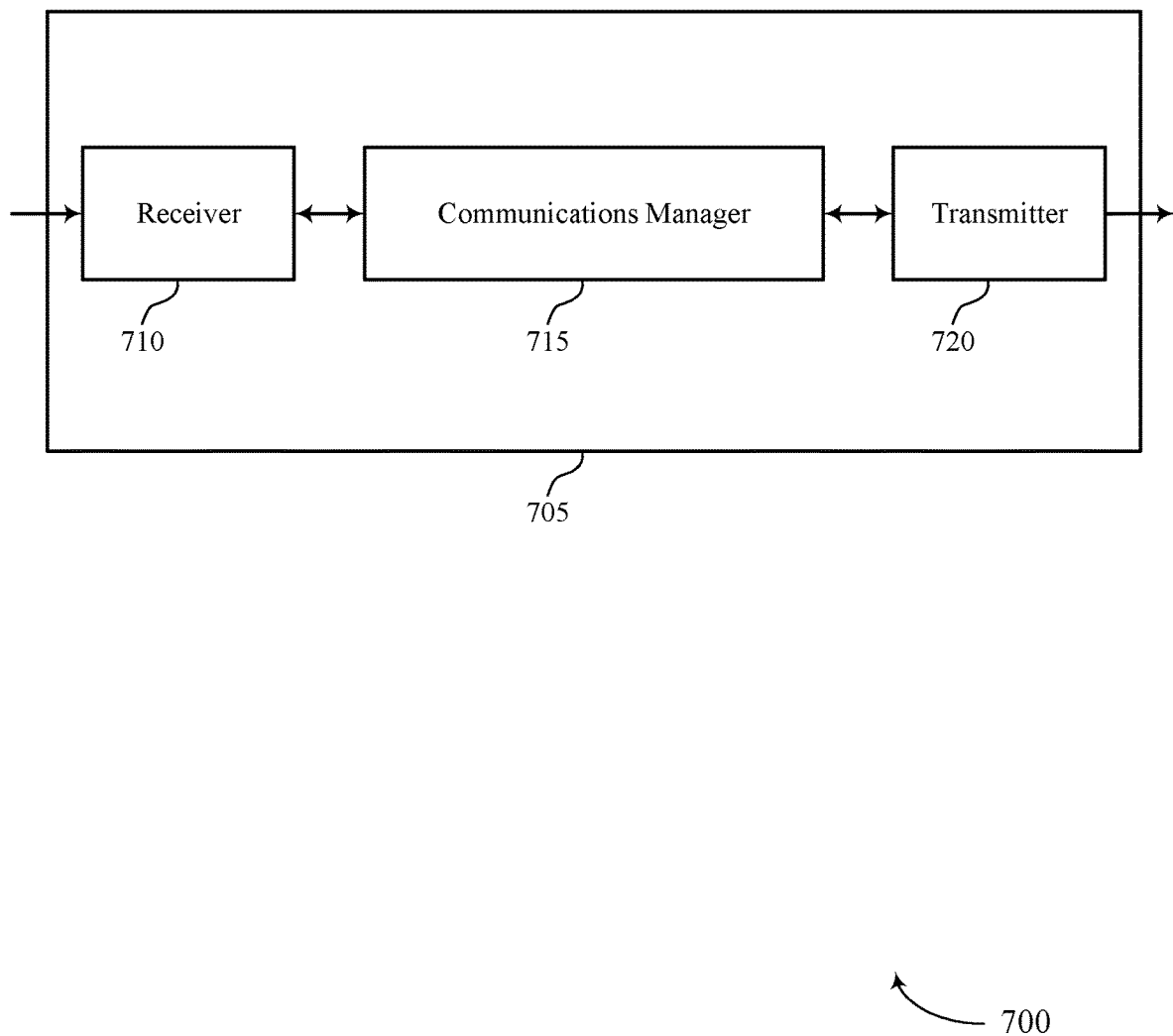
FIGS. 7 and 8 show block diagrams of devices that support boosted index modulation for noncoherent modulation in accordance with aspects of the present disclosure.

FIG. 7 shows a block diagram 700 of a device 705 that supports boosted index modulation for noncoherent modulation in accordance with aspects of the present disclosure. The device 705 may be an example of aspects of a device as described herein, for example, a base station 105 and a UE 115. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to boosted index modulation for noncoherent modulation, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may segment a set of bits within a transport block into a first subset of bits including modulation bits and a second subset of bits including index modulation bits. The set of bits may be to transmit to a receiving device (e.g., a base station 105, a UE 115). The communications manager 715 may map the first subset of bits to a first set of subcarriers, the second subset of bits to a second set of subcarriers, and an additional set of bits to a third set of subcarriers. The communications manager 715 may generate a signal according to a boosting factor based on mapping the first subset of bits, the second subset of bits, and the additional set of bits, and transmit the generated signal to the receiving device (e.g., a base station 105, a UE 115).

The communications manager 715 may determine a threshold energy for receiving a signal including a set of subcarriers from a transmitting device (e.g., a base station 105, a UE 115). The communications manager 715 may demodulate the signal based on a detected energy of the signal satisfying the threshold energy. The communications manager 715 may demap the signal to a first subset of subcarriers and a second subset of subcarriers. The communications manager 715 may decode the first subset of subcarriers to a number of modulated data bits and the second subset of subcarriers to a number of index modulated data bits based on the demapping. The communications manager 715 may be an example of aspects of the communications manager 1010 described herein. By including or configuring the communications manager 715 in accordance with examples as described herein, the device 705 may support techniques for improved communication reliability and reduced latency, among other benefits. For example, the device 705 may perform wireless communications with increased reliability based on using boosted index modulation for noncoherent modulation.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception. The communications manager 715 as described herein may be implemented to realize one or more potential advantages. Various implementations may enable implementing increased SNR by boosting a transmitted signal or by signal repetition. At least one implementation may enable the communications manager 715 to effectively apply a boosting factor to a number of mapped subcarriers of a transmitted signal, and include a number of silent subcarriers to maintain a total energy of the transmitted signal. At least one implementation may enable the communications manager 715 to segment input bits into QAM bits and index modulation bits. Based on implementing the signal boosting and/or repetition techniques as described herein, one or more processors of the device 705 (e.g., processor(s) controlling or incorporated with one or more of the receiver 710, the communications manager 715, and the transmitter 720) may increase the SNR of the transmitted signal. In other examples, the signal boosting and/or repetition techniques may increase the communications efficiency in the wireless communications system (e.g., for URLLC implementations).

Figure 8:
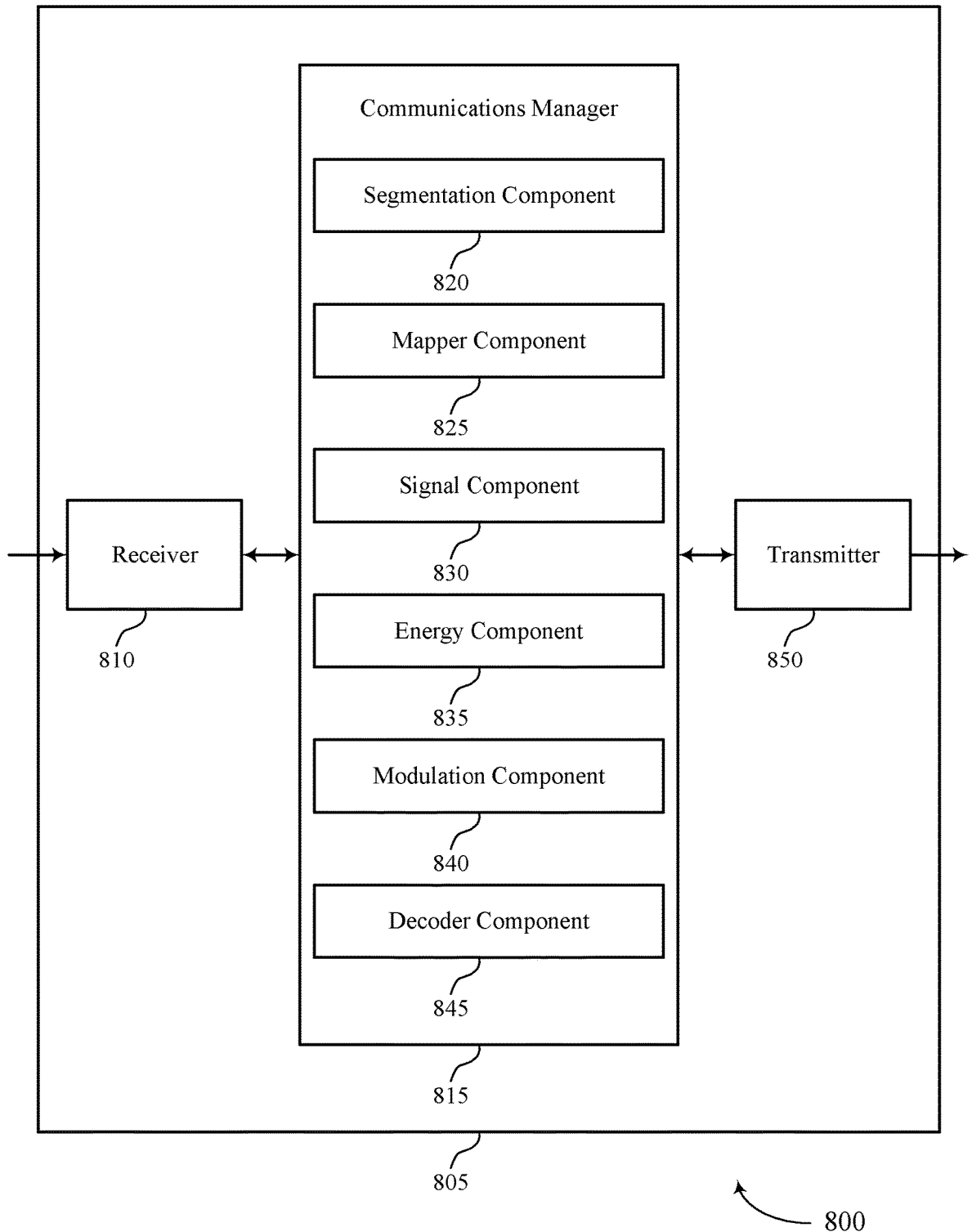

FIG. 8 shows a block diagram 800 of a device 805 that supports boosted index modulation for noncoherent modulation in accordance with aspects of the present disclosure. The device 805 may be an example of aspects of a device 705, a base station 105, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to boosted index modulation for noncoherent modulation, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a segmentation component 820, a mapper component 825, a signal component 830, an energy component 835, a modulation component 840, and a decoder component 845. The communications manager 815 may be an example of aspects of the communications manager 1010 described herein.

The segmentation component 820 may segment a set of bits within a transport block into a first subset of bits including modulation bits and a second subset of bits including index modulation bits, the set of bits to transmit to a receiving device (e.g., a base station 105, a UE 115). The mapper component 825 may map the first subset of bits to a first set of subcarriers, the second subset of bits to a second set of subcarriers, and an additional set of bits to a third set of subcarriers. The signal component 830 may generate a signal according to a boosting factor based on mapping the first subset of bits, the second subset of bits, and the additional set of bits and transmit the generated signal to the receiving device (e.g., a base station 105, a UE 115).

The energy component 835 may determine a threshold energy for receiving a signal including a set of subcarriers from a transmitting device (e.g., a base station 105, a UE 115). The modulation component 840 may demodulate the signal based on a detected energy of the signal satisfying the threshold energy. The mapper component 825 may demap the signal to a first subset of subcarriers and a second subset of subcarriers. The decoder component 845 may decode the first subset of subcarriers to a number of modulated data bits and the second subset of subcarriers to a number of index modulated data bits based on the demapping.

The transmitter 850 may transmit signals generated by other components of the device 805. In some examples, the transmitter 850 may be collocated with a receiver 810 in a transceiver component. For example, the transmitter 850 may be an example of aspects of the transceiver 1020 described with reference to FIG. 10. The transmitter 850 may utilize a single antenna or a set of antennas.

Figure 9:
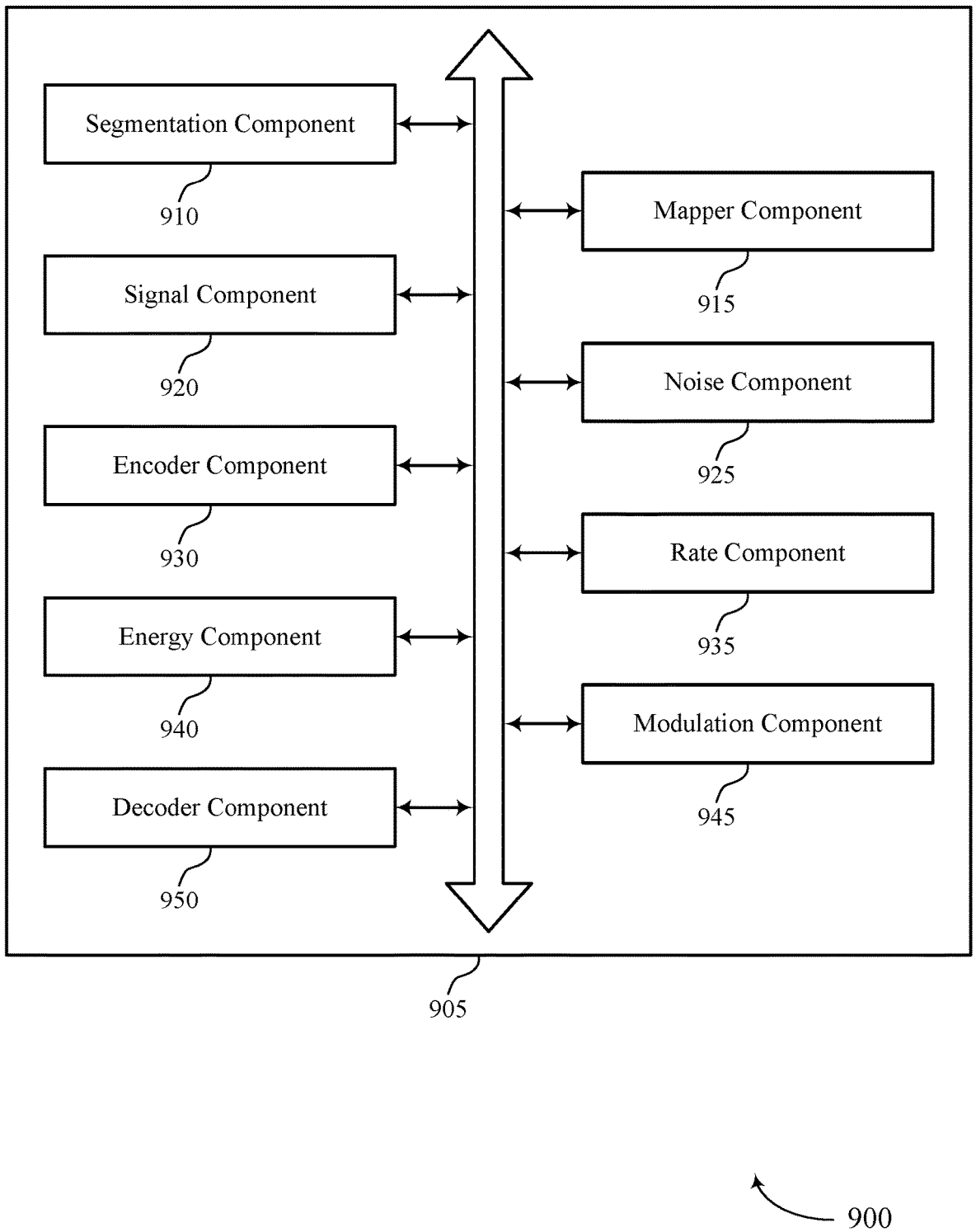
FIG. 9 shows a block diagram of a communications manager that supports boosted index modulation for noncoherent modulation in accordance with aspects of the present disclosure.

FIG. 9 shows a block diagram 900 of a communications manager 905 that supports boosted index modulation for noncoherent modulation in accordance with aspects of the present disclosure. The communications manager 905 may be an example of aspects of a communications manager 715, a communications manager 815, or a communications manager 1010 described herein. The communications manager 905 may include a segmentation component 910, a mapper component 915, a signal component 920, a noise component 925, an encoder component 930, a rate component 935, an energy component 940, a modulation component 945, and a decoder component 950. Each of these components may communicate, directly or indirectly, with one another (e.g., via one or more buses).

The segmentation component 910 may segment a set of bits within a transport block into a first subset of bits including modulation bits and a second subset of bits including index modulation bits, the set of bits to transmit to a receiving device. The mapper component 915 may map the first subset of bits to a first set of subcarriers, the second subset of bits to a second set of subcarriers, and an additional set of bits to a third set of subcarriers. In some examples, the mapper component 915 may demap the signal to a first subset of subcarriers and a second subset of subcarriers. In some examples, the mapper component 915 may apply the boosting factor to the first subset of bits and the second subset of bits, where mapping the first subset of bits to the first set of subcarriers and the second subset of bits to the second set of subcarriers includes:

In some examples, the mapper component 915 may identify the third set of subcarriers as including an empty set.

In some examples, the mapper component 915 may scale the third set of subcarriers based on the boosting factor and a total energy of the generated signal. In some examples, the mapper component 915 may map the first subset of bits to the first set of subcarriers and the second subset of bits to the second set of subcarriers based on a location of a data bit in the transport block. In some examples, the mapper component 915 may identify the location of the data bit based on an index modulation scheme associated with the first subset of bits and the second subset of bits.

In some examples, the mapper component 915 may add a number of index modulation bits to the second set of subcarriers in accordance with the mapping, where the number of index modulation bits is based on a logarithmic operation on the boosting factor. In some examples, the mapper component 915 may scale a mapping rate based on the modulation bits, a log base 2 of a square root of the boosting factor, a repetition rate, or any combination thereof. In some cases, the index modulation scheme includes a Gray index modulation scheme. In some cases, the logarithmic operation includes a log base 2 of a square root of the boosting factor.

The signal component 920 may generate a signal according to a boosting factor based on mapping the first subset of bits, the second subset of bits, and the additional set of bits. In some examples, the signal component 920 may transmit the generated signal to the receiving device. In some examples, the signal component 920 may combine data associated with the first subset of subcarriers and the second subset of subcarriers. In some cases, the boosting factor includes a square root of a repetition factor. In some cases, the first subset of bits includes a set of QAM bits.

In some cases, the generated signal includes a same total energy equal to a second signal generated without the boosting factor. In some cases, the boosting factor is configured based on an MCS value, a constellation mapping configuration, one or more frequency allocation parameters, one or more channel conditions, or any combination thereof. In some cases, the boosting factor is configured in a DCI message or a lookup table, or both. In some cases, a data bit includes an indication of the signal satisfying the threshold energy. In some cases, the boosting factor is configured in an RRC connection establishment message including a set of parameters indicating the boosting factor.

The energy component 940 may determine a threshold energy for receiving a signal including a set of subcarriers from a transmitting device. In some examples, the energy component 940 may determine that the detected energy of the signal fails to satisfy the threshold energy. In some examples, the energy component 940 may identify a set of empty subcarriers transmitted with the signal based on the detected energy. In some examples, the energy component 940 may allocate the set of empty subcarriers for noise coherence estimation. In some cases, a total energy of the signal is based on a boosting factor. In some cases, a boosting factor is configured in a DCI message or a lookup table, or both. In some cases, the boosting factor is configured in an RRC connection establishment message including a set of parameters indicating the boosting factor.

The modulation component 945 may demodulate the signal based on a detected energy of the signal satisfying the threshold energy. In some examples, the modulation component 945 may demodulate the first set of subcarriers and the second set of subcarriers based on the detected energy and a location of a number of data bits. In some examples, the modulation component 945 may determine an outcome of an error check procedure on the number of data bits.

The decoder component 950 may decode the first subset of subcarriers to a number of modulated data bits and the second subset of subcarriers to a number of index modulated data bits based on the demapping. In some examples, the decoder component 950 may generate a number of log likelihood ratio values associated with the number of index modulated data bits. In some examples, the decoder component 950 may decode the number of data bits based on the determining. In some examples, the decoder component 950 may decode the data based on the scaled decoding rate.

The noise component 925 may perform noise coherence estimation for the generated signal using the third set of subcarriers based on scaling the third set of subcarriers. The encoder component 930 may encode the set of bits based on the boosting factor. The rate component 935 may rate matching the encoded set of bits based on the boosting factor. In some examples, the rate component 935 may increase a rate of the encoding based on the boosting factor. In some examples, the rate component 935 may identify a repetition rate for the received signal. In some examples, the rate component 935 may scale a decoding rate of the first subset of subcarriers and the second subset of subcarriers based on the repetition rate.

Figure 10:
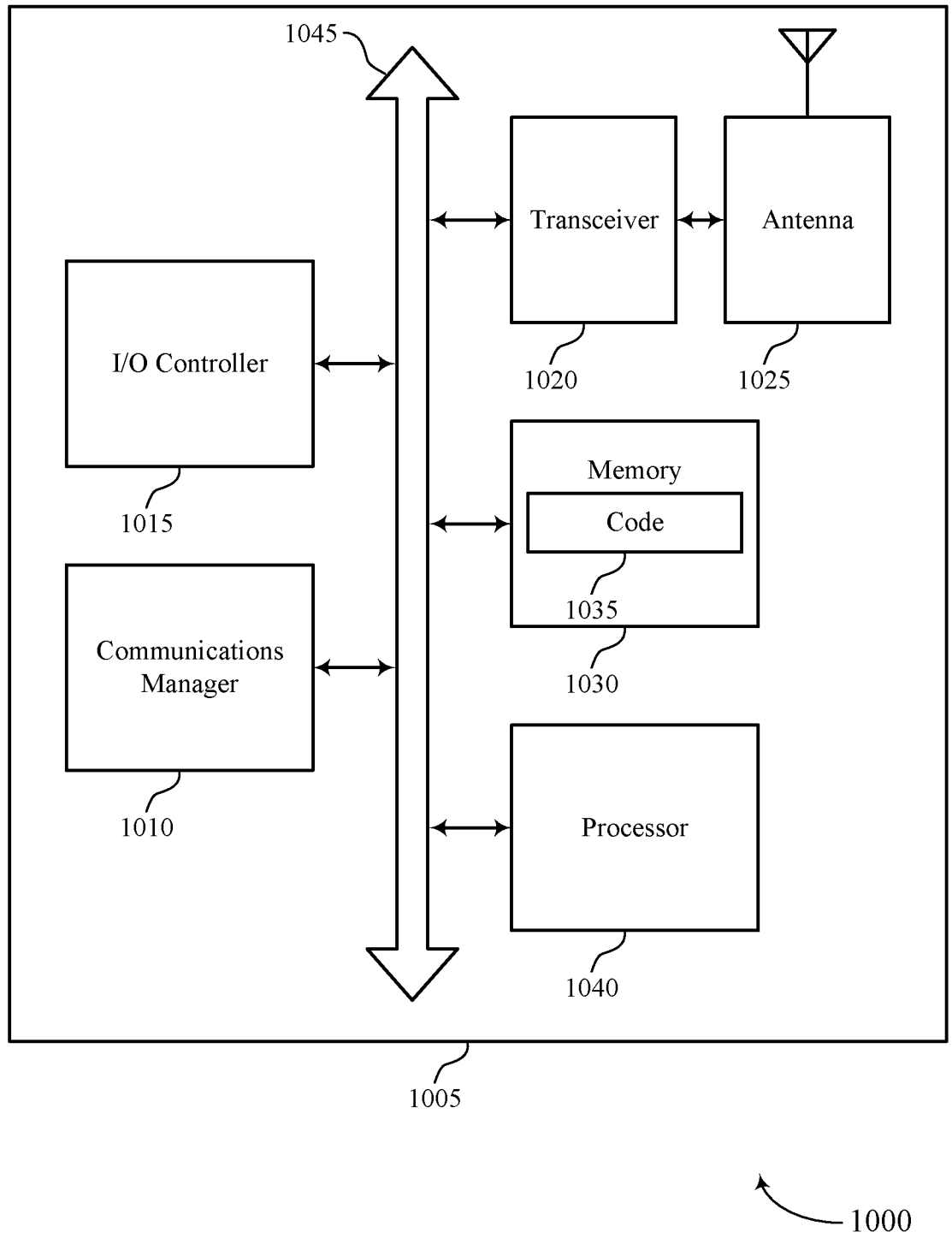
FIG. 10 shows a diagram of a system including a device that supports boosted index modulation for noncoherent modulation in accordance with aspects of the present disclosure.

FIG. 10 shows a diagram of a system 1000 including a device 1005 that supports boosted index modulation for noncoherent modulation in accordance with aspects of the present disclosure. The device 1005 may be an example of or include the components of device 705, device 805, or a device (e.g., a base station 105, a UE 115) as described herein. The device 1005 may include components for bi-directional voice and data communications including components for transmitting and receiving communications, including a communications manager 1010, an I/O controller 1015, a transceiver 1020, an antenna 1025, memory 1030, a processor 1040, and a coding manager 1050. These components may be in electronic communication via one or more buses (e.g., bus 1045).

The communications manager 1010 may segment a set of bits within a transport block into a first subset of bits including modulation bits and a second subset of bits including index modulation bits. The set of bits may be segmented to transmit to a receiving device (e.g., a base station 105, a UE 115). The communications manager 1010 may map the first subset of bits to a first set of subcarriers, the second subset of bits to a second set of subcarriers, and an additional set of bits to a third set of subcarriers. The communications manager 1010 may generate a signal according to a boosting factor based on mapping the first subset of bits, the second subset of bits, and the additional set of bits, and transmit the generated signal to the receiving device (e.g., a base station 105, a UE 115).

The communications manager 1010 may determine a threshold energy for receiving a signal including a set of subcarriers from a transmitting device (e.g., a base station 105, a UE 115). The communications manager 1010 may demodulate the signal based on a detected energy of the signal satisfying the threshold energy and demap the signal to a first subset of subcarriers and a second subset of subcarriers. The communications manager 1010 may decode the first subset of subcarriers to a number of modulated data bits and the second subset of subcarriers to a number of index modulated data bits based on the demapping.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting boosted index modulation for noncoherent modulation).

Figure 11:
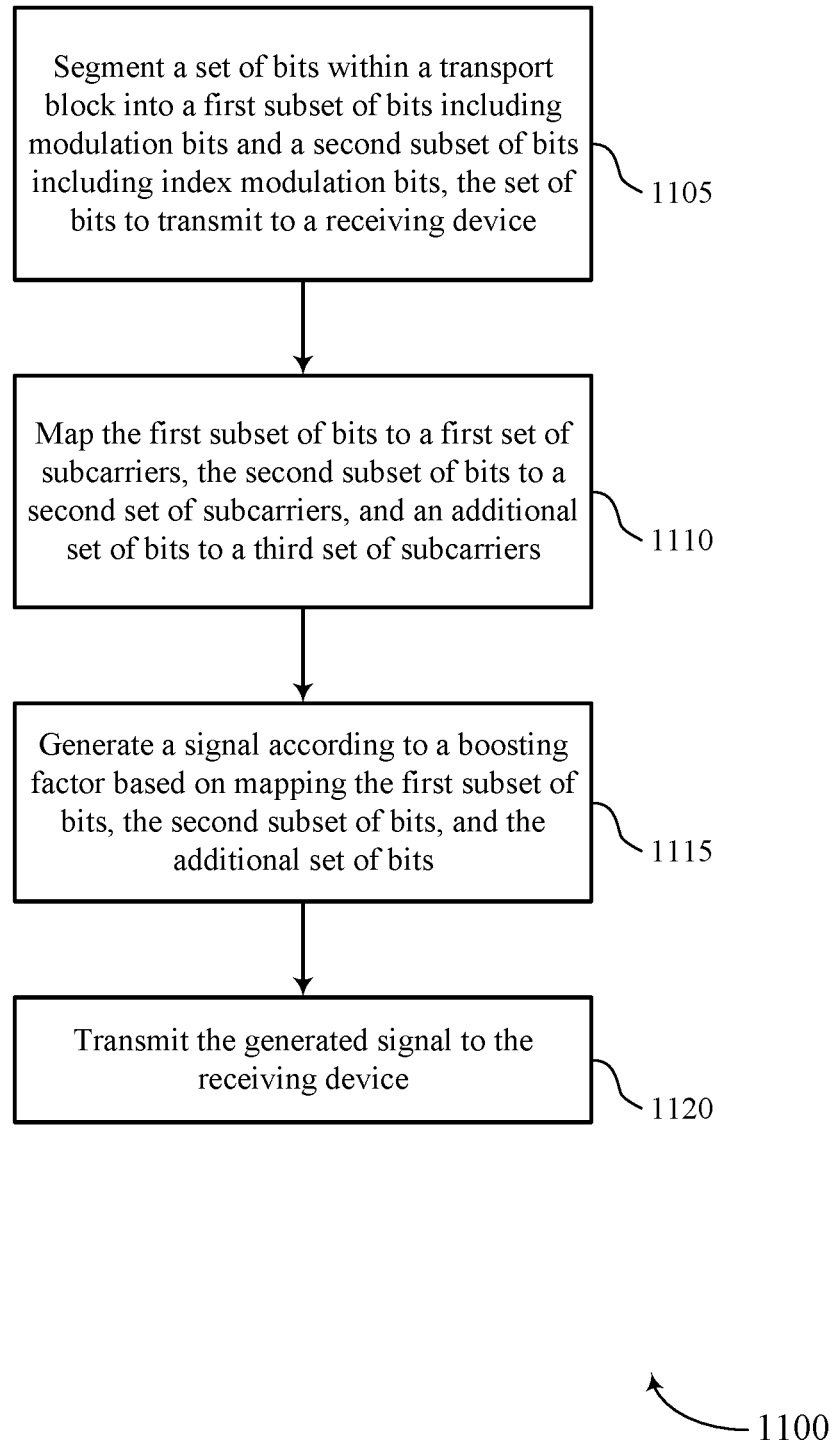
FIGS. 11 through 15 show flowcharts illustrating methods that support boosted index modulation for noncoherent modulation in accordance with aspects of the present disclosure.

FIG. 11 shows a flowchart illustrating a method 1100 that supports boosted index modulation for noncoherent modulation in accordance with aspects of the present disclosure. The operations of method 1100 may be implemented by a transmitting device (e.g., a base station 105, a UE 115) or its components as described herein. For example, the operations of method 1100 may be performed by a communications manager as described with reference to FIGS. 7 through 10. In some examples, a transmitting device (e.g., a base station 105, a UE 115) may execute a set of instructions to control the functional elements of the device to perform the functions described herein. Additionally or alternatively, a transmitting device (e.g., a base station 105, a UE 115) may perform aspects of the functions described herein using special-purpose hardware.

At 1105, the transmitting device may segment a set of bits within a transport block into a first subset of bits including modulation bits and a second subset of bits including index modulation bits, the set of bits to transmit to a receiving device. The operations of 1105 may be performed according to the methods described herein. In some examples, aspects of the operations of 1105 may be performed by a segmentation component as described with reference to FIGS. 7 through 10.

At 1110, the transmitting device may map the first subset of bits to a first set of subcarriers, the second subset of bits to a second set of subcarriers, and an additional set of bits to a third set of subcarriers. The operations of 1110 may be performed according to the methods described herein. In some examples, aspects of the operations of 1110 may be performed by a mapper component as described with reference to FIGS. 7 through 10.

At 1115, the transmitting device may generate a signal according to a boosting factor based on mapping the first subset of bits, the second subset of bits, and the additional set of bits. The operations of 1115 may be performed according to the methods described herein. In some examples, aspects of the operations of 1115 may be performed by a signal component as described with reference to FIGS. 7 through 10.

At 1120, the transmitting device may transmit the generated signal to the receiving device. The operations of 1120 may be performed according to the methods described herein. In some examples, aspects of the operations of 1120 may be performed by a signal component as described with reference to FIGS. 7 through 10.

Figure 12:
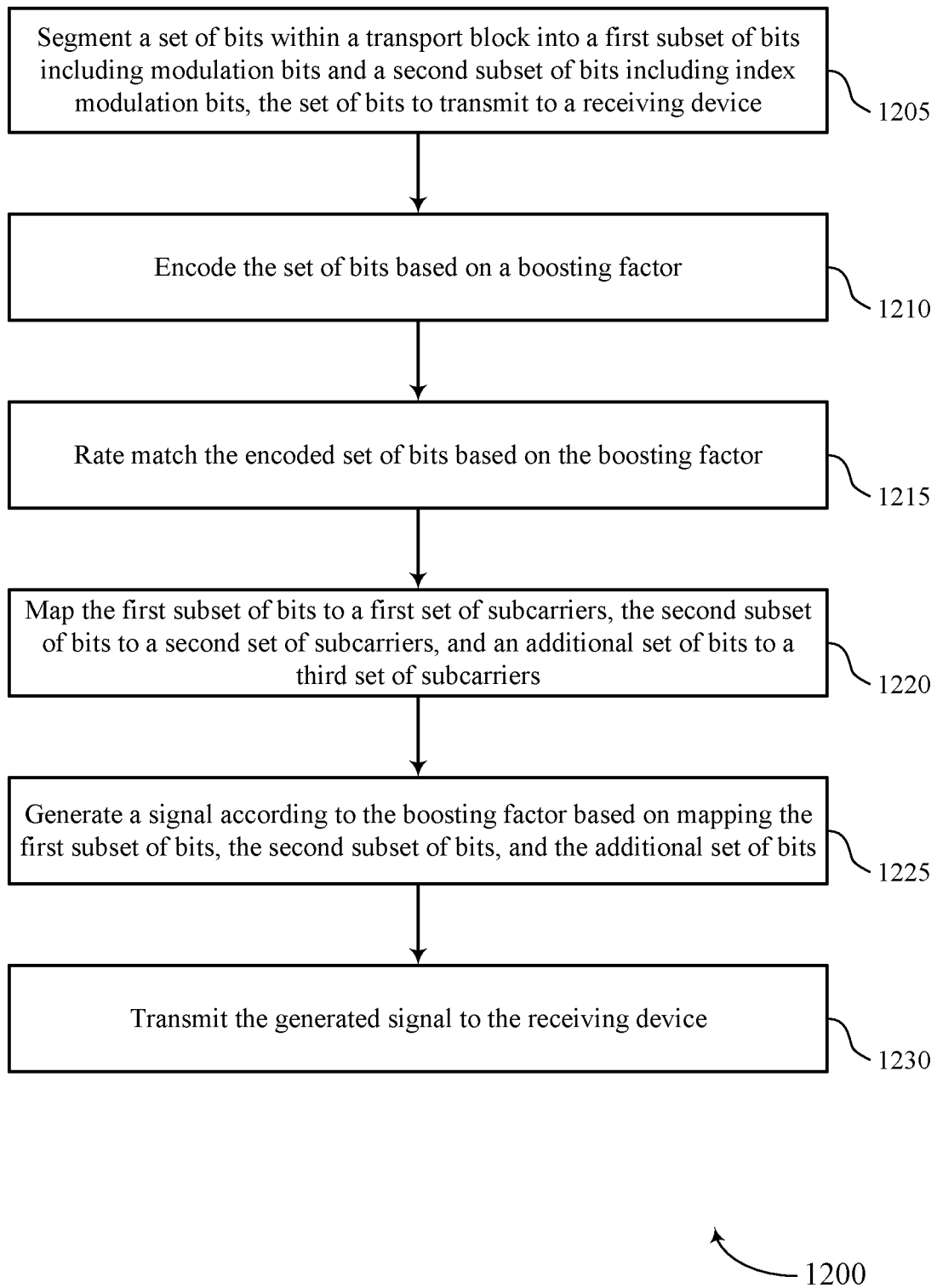

FIG. 12 shows a flowchart illustrating a method 1200 that supports boosted index modulation for noncoherent modulation in accordance with aspects of the present disclosure. The operations of method 1200 may be implemented by a transmitting device (e.g., a base station 105, a UE 115) or its components as described herein. For example, the operations of method 1200 may be performed by a communications manager as described with reference to FIGS. 7 through 10. In some examples, a transmitting device (e.g., a base station 105, a UE 115) may execute a set of instructions to control the functional elements of the device to perform the functions described herein. Additionally or alternatively, a transmitting device (e.g., a base station 105, a UE 115) may perform aspects of the functions described herein using special-purpose hardware.

At 1205, the transmitting device may segment a set of bits within a transport block into a first subset of bits including modulation bits and a second subset of bits including index modulation bits, the set of bits to transmit to a receiving device. The operations of 1205 may be performed according to the methods described herein. In some examples, aspects of the operations of 1205 may be performed by a segmentation component as described with reference to FIGS. 7 through 10.

At 1210, the transmitting device may encode the set of bits based on a boosting factor. The operations of 1210 may be performed according to the methods described herein. In some examples, aspects of the operations of 1210 may be performed by an encoder component as described with reference to FIGS. 7 through 10.

At 1215, the transmitting device may rate match the encoded set of bits based on the boosting factor. The operations of 1215 may be performed according to the methods described herein. In some examples, aspects of the operations of 1215 may be performed by a rate component as described with reference to FIGS. 7 through 10.

At 1220, the transmitting device may map the first subset of bits to a first set of subcarriers, the second subset of bits to a second set of subcarriers, and an additional set of bits to a third set of subcarriers. The operations of 1220 may be performed according to the methods described herein. In some examples, aspects of the operations of 1220 may be performed by a mapper component as described with reference to FIGS. 7 through 10.

At 1225, the transmitting device may generate a signal according to a boosting factor based on mapping the first subset of bits, the second subset of bits, and the additional set of bits. The operations of 1225 may be performed according to the methods described herein. In some examples, aspects of the operations of 1225 may be performed by a signal component as described with reference to FIGS. 7 through 10.

At 1230, the transmitting device may transmit the generated signal to the receiving device. The operations of 1230 may be performed according to the methods described herein. In some examples, aspects of the operations of 1230 may be performed by a signal component as described with reference to FIGS. 7 through 10.

Figure 13:
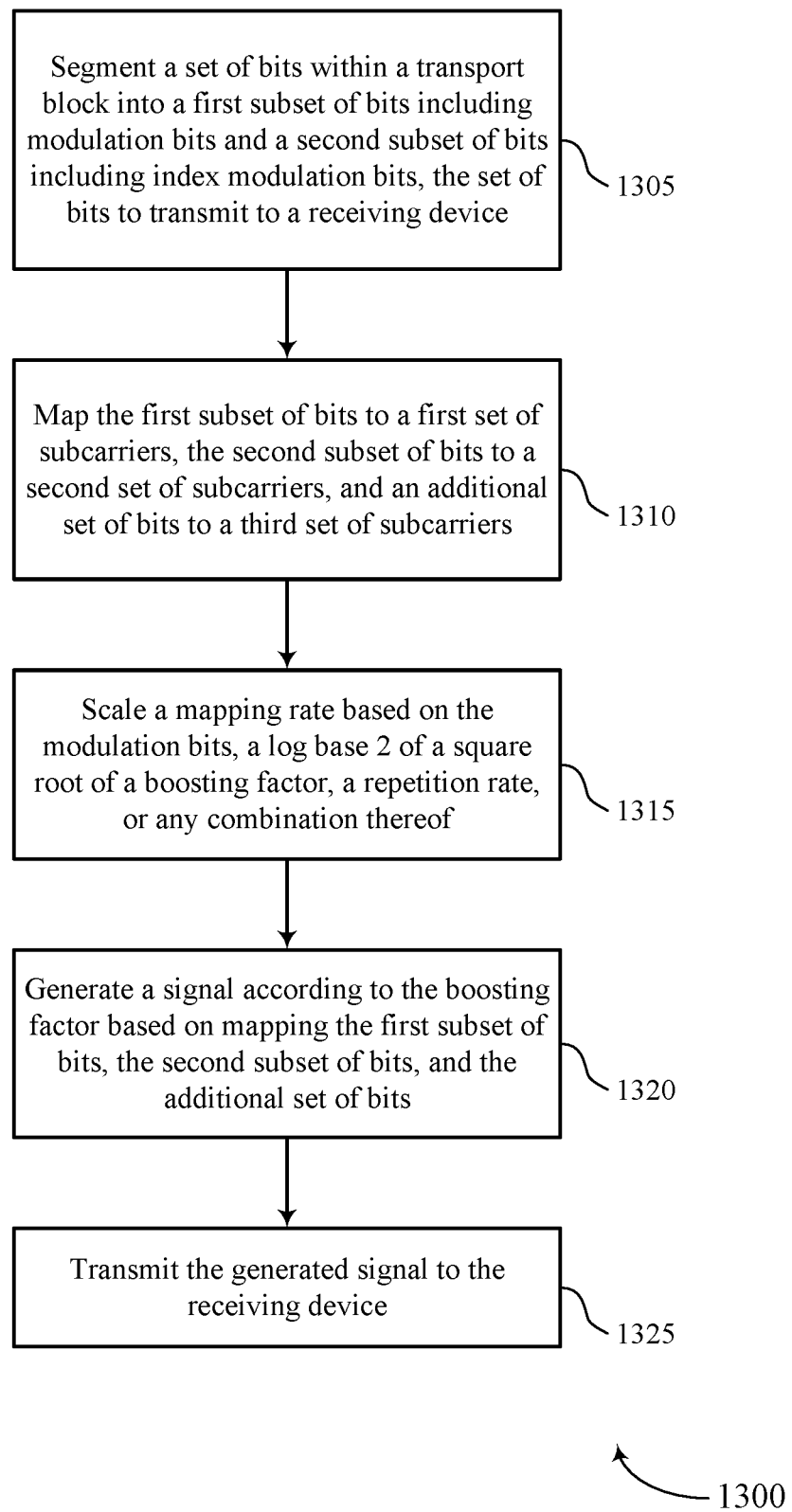

FIG. 13 shows a flowchart illustrating a method 1300 that supports boosted index modulation for noncoherent modulation in accordance with aspects of the present disclosure. The operations of method 1300 may be implemented by a transmitting device (e.g., a base station 105, a UE 115) or its components as described herein. For example, the operations of method 1300 may be performed by a communications manager as described with reference to FIGS. 7 through 10. In some examples, a transmitting device (e.g., a base station 105, a UE 115) may execute a set of instructions to control the functional elements of the device to perform the functions described herein. Additionally or alternatively, a transmitting device (e.g., a base station 105, a UE 115) may perform aspects of the functions described herein using special-purpose hardware.

At 1305, the transmitting device may segment a set of bits within a transport block into a first subset of bits including modulation bits and a second subset of bits including index modulation bits, the set of bits to transmit to a receiving device. The operations of 1305 may be performed according to the methods described herein. In some examples, aspects of the operations of 1305 may be performed by a segmentation component as described with reference to FIGS. 7 through 10.

At 1310, the transmitting device may map the first subset of bits to a first set of subcarriers, the second subset of bits to a second set of subcarriers, and an additional set of bits to a third set of subcarriers. The operations of 1310 may be performed according to the methods described herein. In some examples, aspects of the operations of 1310 may be performed by a mapper component as described with reference to FIGS. 7 through 10.

At 1315, the transmitting device may scale a mapping rate based on the modulation bits, a log base 2 of a square root of a boosting factor, a repetition rate, or any combination thereof. The operations of 1315 may be performed according to the methods described herein. In some examples, aspects of the operations of 1315 may be performed by a mapper component as described with reference to FIGS. 7 through 10.

At 1320, the transmitting device may generate a signal according to the boosting factor based on mapping the first subset of bits, the second subset of bits, and the additional set of bits. The operations of 1320 may be performed according to the methods described herein. In some examples, aspects of the operations of 1320 may be performed by a signal component as described with reference to FIGS. 7 through 10.

At 1325, the transmitting device may transmit the generated signal to the receiving device. The operations of 1325 may be performed according to the methods described herein. In some examples, aspects of the operations of 1325 may be performed by a signal component as described with reference to FIGS. 7 through 10.

Figure 14:
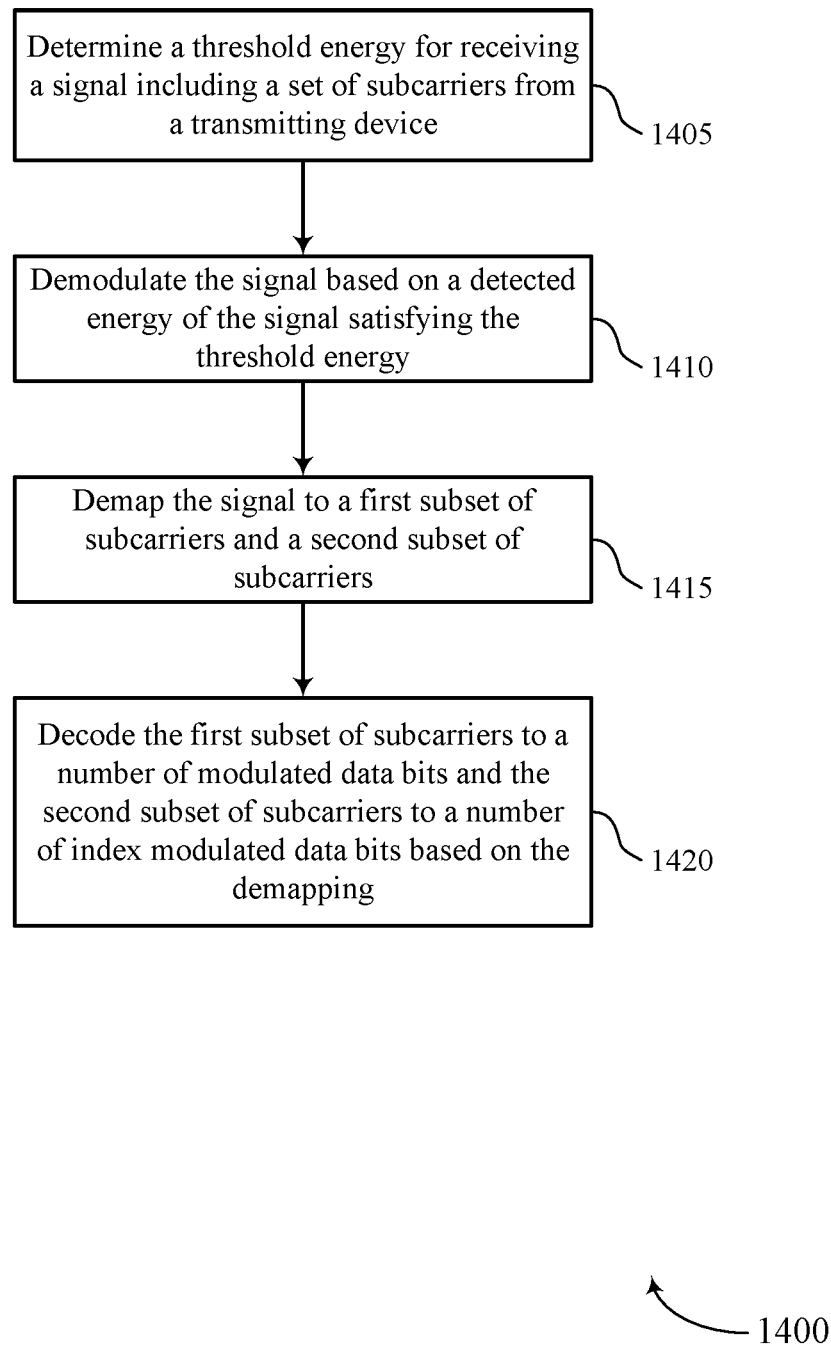

FIG. 14 shows a flowchart illustrating a method 1400 that supports boosted index modulation for noncoherent modulation in accordance with aspects of the present disclosure. The operations of method 1400 may be implemented by a receiving device (e.g., a base station 105, a UE 115) or its components as described herein. For example, the operations of method 1400 may be performed by a communications manager as described with reference to FIGS. 7 through 10. In some examples, a receiving device (e.g., a base station 105, a UE 115) may execute a set of instructions to control the functional elements of the device to perform the functions described herein. Additionally or alternatively, a receiving device (e.g., a base station 105, a UE 115) may perform aspects of the functions described herein using special-purpose hardware.

At 1405, the receiving device may determine a threshold energy for receiving a signal including a set of subcarriers from a transmitting device. The operations of 1405 may be performed according to the methods described herein. In some examples, aspects of the operations of 1405 may be performed by an energy component as described with reference to FIGS. 7 through 10.

At 1410, the receiving device may demodulate the signal based on a detected energy of the signal satisfying the threshold energy. The operations of 1410 may be performed according to the methods described herein. In some examples, aspects of the operations of 1410 may be performed by a modulation component as described with reference to FIGS. 7 through 10.

At 1415, the receiving device may demap the signal to a first subset of subcarriers and a second subset of subcarriers. The operations of 1415 may be performed according to the methods described herein. In some examples, aspects of the operations of 1415 may be performed by a mapper component as described with reference to FIGS. 7 through 10.

At 1420, the receiving device may decode the first subset of subcarriers to a number of modulated data bits and the second subset of subcarriers to a number of index modulated data bits based on the demapping. The operations of 1420 may be performed according to the methods described herein. In some examples, aspects of the operations of 1420 may be performed by a decoder component as described with reference to FIGS. 7 through 10.

Figure 15:
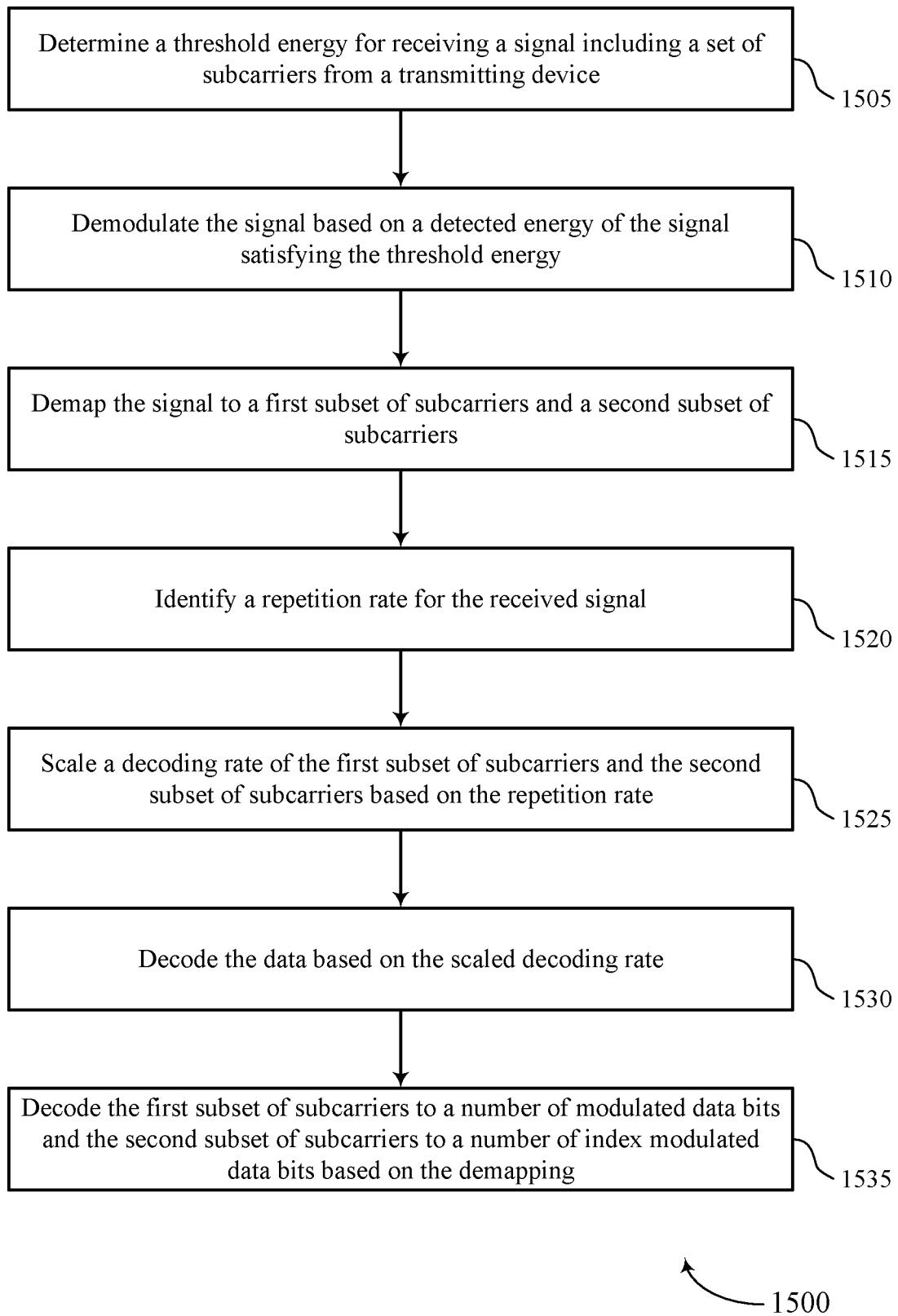

FIG. 15 shows a flowchart illustrating a method 1500 that supports boosted index modulation for noncoherent modulation in accordance with aspects of the present disclosure. The operations of method 1500 may be implemented by a receiving device (e.g., a base station 105, a UE 115) or its components as described herein. For example, the operations of method 1500 may be performed by a communications manager as described with reference to FIGS. 7 through 10. In some examples, a receiving device (e.g., a base station 105, a UE 115) may execute a set of instructions to control the functional elements of the device to perform the functions described herein. Additionally or alternatively, a receiving device (e.g., a base station 105, a UE 115) may perform aspects of the functions described herein using special-purpose hardware.

At 1505, the receiving device may determine a threshold energy for receiving a signal including a set of subcarriers from a transmitting device. The operations of 1505 may be performed according to the methods described herein. In some examples, aspects of the operations of 1505 may be performed by an energy component as described with reference to FIGS. 7 through 10.

At 1510, the receiving device may demodulate the signal based on a detected energy of the signal satisfying the threshold energy. The operations of 1510 may be performed according to the methods described herein. In some examples, aspects of the operations of 1510 may be performed by a modulation component as described with reference to FIGS. 7 through 10.

At 1515, the receiving device may demap the signal to a first subset of subcarriers and a second subset of subcarriers. The operations of 1515 may be performed according to the methods described herein. In some examples, aspects of the operations of 1515 may be performed by a mapper component as described with reference to FIGS. 7 through 10.

At 1520, the receiving device may identify a repetition rate for the received signal. The operations of 1520 may be performed according to the methods described herein. In some examples, aspects of the operations of 1520 may be performed by a rate component as described with reference to FIGS. 7 through 10.

At 1525, the receiving device may scale a decoding rate of the first subset of subcarriers and the second subset of subcarriers based on the repetition rate. The operations of 1525 may be performed according to the methods described herein. In some examples, aspects of the operations of 1525 may be performed by a rate component as described with reference to FIGS. 7 through 10.

At 1530, the receiving device may decode the data based on the scaled decoding rate. The operations of 1530 may be performed according to the methods described herein. In some examples, aspects of the operations of 1530 may be performed by a decoder component as described with reference to FIGS. 7 through 10.

At 1535, the receiving device may decode the first subset of subcarriers to a number of modulated data bits and the second subset of subcarriers to a number of index modulated data bits based on the demapping. The operations of 1535 may be performed according to the methods described herein. In some examples, aspects of the operations of 1535 may be performed by a decoder component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a transmitting device, comprising: segmenting a set of bits within a transport block into a first subset of bits comprising modulation bits and a second subset of bits comprising index modulation bits, the set of bits to transmit to a receiving device; mapping the first subset of bits to a first set of subcarriers, the second subset of bits to a second set of subcarriers, and an additional set of bits to a third set of subcarriers; generating a signal according to a boosting factor based at least in part on mapping the first subset of bits, the second subset of bits, and the additional set of bits; and transmitting the generated signal to the receiving device.

Aspect 2: The method of aspect 1, wherein applying the boosting factor to the first subset of bits and the second subset of bits, wherein mapping the first subset of bits to the first set of subcarriers and the second subset of bits to the second set of subcarriers comprises: mapping the first subset of bits to the first set of subcarriers and the second subset of bits to the second set of subcarriers based at least in part on the boosting factor.

Aspect 3: The method of any of aspects 1 through 2, further comprising: identifying the third set of subcarriers as comprising an empty set; and scaling the third set of subcarriers based at least in part on the boosting factor and a total energy of the generated signal.

Aspect 4: The method of aspect 3, further comprising: performing noise coherence estimation for the generated signal using the third set of subcarriers based at least in part on scaling the third set of subcarriers.

Aspect 5: The method of any of aspects 1 through 4, further comprising: encoding the set of bits based at least in part on the boosting factor; and rate matching the encoded set of bits based at least in part on the boosting factor.

Aspect 6: The method of aspect 5, wherein encoding the set of bits comprises: increasing a rate of the encoding based at least in part on the boosting factor.

Aspect 7: The method of any of aspects 1 through 6, wherein the boosting factor comprises a square root of a repetition factor.

Aspect 8: The method of any of aspects 1 through 7, wherein the first subset of bits comprises a set of QAM bits.

Aspect 9: The method of any of aspects 1 through 8, wherein mapping the first subset of bits to the first set of subcarriers and the second subset of bits to the second set of subcarriers comprises: mapping the first subset of bits to the first set of subcarriers and the second subset of bits to the second set of subcarriers based at least in part on a location of a data bit in the transport block.

Aspect 10: The method of aspect 9, further comprising: identifying the location of the data bit based at least in part on an index modulation scheme associated with the first subset of bits and the second subset of bits.

Aspect 11: The method of aspect 10, wherein the index modulation scheme comprises a Gray index modulation scheme.

Aspect 12: The method of any of aspects 1 through 11, further comprising: adding a number of index modulation bits to the second set of subcarriers in accordance with the mapping, wherein the number of index modulation bits is based at least in part on a logarithmic operation on the boosting factor.

Aspect 13: The method of aspect 12, wherein the logarithmic operation comprises a log base 2 of a square root of the boosting factor.

Aspect 14: The method of any of aspects 1 through 13, wherein mapping the modulation bits to the first set of subcarriers and the index modulation bits to the second set of subcarriers further comprises: scaling a mapping rate based at least in part on the modulation bits, a log base 2 of a square root of the boosting factor, a repetition rate, or any combination thereof.

Aspect 15: The method of any of aspects 1 through 14, wherein the generated signal comprises a same total energy equal to a second signal generated without the boosting factor.

Aspect 16: The method of any of aspects 1 through 15, wherein the boosting factor is configured based at least in part on a modulation and coding scheme value, a constellation mapping configuration, one or more frequency allocation parameters, one or more channel conditions, or any combination thereof.

Aspect 17: The method of any of aspects 1 through 16, wherein the boosting factor is configured in a DCI message or a lookup table, or both.

Aspect 18: The method of any of aspects 1 through 17, wherein the boosting factor is configured in an RRC connection establishment message including a set of parameters indicating the boosting factor.

Aspect 19: A method for wireless communications at a receiving device, comprising: determining a threshold energy for receiving a signal comprising a set of subcarriers from a transmitting device; demodulating the signal based at least in part on a detected energy of the signal satisfying the threshold energy; demapping the signal to a first subset of subcarriers and a second subset of subcarriers; and decoding the first subset of subcarriers to a number of modulated data bits and the second subset of subcarriers to a number of index modulated data bits based at least in part on the demapping.

Aspect 20: The method of aspect 19, further comprising: generating a number of log likelihood ratio values associated with the number of index modulated data bits.

Aspect 21: The method of any of aspects 19 through 20, further comprising: demodulating the first set of subcarriers and the second set of subcarriers based at least in part on the detected energy and a location of a number of data bits; determining an outcome of an error check procedure on the number of data bits; and decoding the number of data bits based at least in part on the determining.

Aspect 22: The method of any of aspects 19 through 21, further comprising: determining that the detected energy of the signal fails to satisfy the threshold energy; identifying a set of empty subcarriers transmitted with the signal based at least in part on the detected energy; and allocating the set of empty subcarriers for noise coherence estimation.

Aspect 23: The method of any of aspects 19 through 22, further comprising: identifying a repetition rate for the received signal; scaling a decoding rate of the first subset of subcarriers and the second subset of subcarriers based at least in part on the repetition rate; and decoding the data based at least in part on the scaled decoding rate.

Aspect 24: The method of any of aspects 19 through 23, wherein the demapping comprises: combining data associated with the first subset of subcarriers and the second subset of subcarriers.

Aspect 25: The method of any of aspects 19 through 24, wherein a data bit comprises an indication of the signal satisfying the threshold energy.

Aspect 26: The method of any of aspects 19 through 25, wherein a total energy of the signal is based at least in part on a boosting factor.

Aspect 27: The method of any of aspects 19 through 26, wherein a boosting factor is configured in a DCI message or a lookup table, or both.

Aspect 28: The method of any of aspects 19 through 27, wherein the boosting factor is configured in an RRC connection establishment message including a set of parameters indicating the boosting factor.

Aspect 29: An apparatus for wireless communications at a transmitting device, comprising a processor; memory coupled with the processor; and instructions stored in the memory and executable by the processor to cause the apparatus to perform a method of any of aspects 1 through 18.

Aspect 30: An apparatus for wireless communications at a transmitting device, comprising at least one means for performing a method of any of aspects 1 through 18.

Aspect 31: A non-transitory computer-readable medium storing code for wireless communications at a transmitting device, the code comprising instructions executable by a processor to perform a method of any of aspects 1 through 18.

Aspect 32: An apparatus for wireless communications at a receiving device, comprising a processor; memory coupled with the processor; and instructions stored in the memory and executable by the processor to cause the apparatus to perform a method of any of aspects 19 through 28.

Aspect 33: An apparatus for wireless communications at a receiving device, comprising at least one means for performing a method of any of aspects 19 through 28.

Aspect 34: A non-transitory computer-readable medium storing code for wireless communications at a receiving device, the code comprising instructions executable by a processor to perform a method of any of aspects 19 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a transmitting device, comprising:
    segmenting a set of bits within a transport block into a first subset of bits comprising modulation bits and a second subset of bits comprising index modulation bits, the set of bits to transmit to a receiving device;
    mapping the first subset of bits to a first set of subcarriers, the second subset of bits to a second set of subcarriers, and an additional set of bits to a third set of subcarriers;
    generating a signal according to a boosting factor based at least in part on mapping the first subset of bits, the second subset of bits, and the additional set of bits; and
    transmitting the generated signal to the receiving device.

2. The method of claim 1, further comprising:
    applying the boosting factor to the first subset of bits and the second subset of bits, wherein mapping the first subset of bits to the first set of subcarriers and the second subset of bits to the second set of subcarriers comprises:
        mapping the first subset of bits to the first set of subcarriers and the second subset of bits to the second set of subcarriers based at least in part on the boosting factor.

3. The method of claim 1, further comprising:
    identifying the third set of subcarriers as comprising an empty set; and
    scaling the third set of subcarriers based at least in part on the boosting factor and a total energy of the generated signal.

4. The method of claim 3, further comprising:
    performing noise coherence estimation for the generated signal using the third set of subcarriers based at least in part on the scaled third set of subcarriers.

5. The method of claim 1, further comprising:
    encoding the set of bits based at least in part on the boosting factor; and
    rate matching the encoded set of bits based at least in part on the boosting factor.

6. The method of claim 5, wherein encoding the set of bits comprises:
    increasing a rate of the encoding based at least in part on the boosting factor.

7. The method of claim 1, wherein the boosting factor comprises a square root of a repetition factor.

8. The method of claim 1, wherein the first subset of bits comprise a set of quadrature amplitude modulated (QAM) bits.

9. The method of claim 1, wherein mapping the first subset of bits to the first set of subcarriers and the second subset of bits to the second set of subcarriers comprises:
    mapping the first subset of bits to the first set of subcarriers and the second subset of bits to the second set of subcarriers based at least in part on a location of a data bit in the transport block.

10. The method of claim 9, further comprising:
    identifying the location of the data bit based at least in part on an index modulation scheme associated with the first subset of bits and the second subset of bits.

11. The method of claim 10, wherein the index modulation scheme comprises a Gray index modulation scheme.

12. The method of claim 1, further comprising:
    adding a number of index modulation bits to the second set of subcarriers in accordance with the mapping, wherein the number of index modulation bits is based at least in part on a logarithmic operation on the boosting factor.

13. The method of claim 12, wherein the logarithmic operation comprises a log base 2 of a square root of the boosting factor.

14. The method of claim 1, wherein mapping the modulation bits to the first set of subcarriers and the index modulation bits to the second set of subcarriers further comprises:
    scaling a mapping rate based at least in part on the modulation bits, a log base 2 of a square root of the boosting factor, a repetition rate, or any combination thereof.

15. The method of claim 1, wherein the generated signal comprises a same total energy equal to a second signal generated without the boosting factor.

16. The method of claim 1, wherein the boosting factor is configured based at least in part on a modulation and coding scheme value, a constellation mapping configuration, one or more frequency allocation parameters, one or more channel conditions, or any combination thereof.

17. The method of claim 1, wherein the boosting factor is configured in a downlink control information message or a lookup table, or both.

18. The method of claim 1, wherein the boosting factor is configured in a radio resource control connection establishment message including a set of parameters indicating the boosting factor.

19. An apparatus for wireless communications, comprising:
    a processor,
    memory coupled with the processor; and
    instructions stored in the memory and executable by the processor to cause the apparatus to:
        segment a set of bits within a transport block into a first subset of bits comprising modulation bits and a second subset of bits comprising index modulation bits, the set of bits to transmit to a receiving apparatus;
        map the first subset of bits to a first set of subcarriers, the second subset of bits to a second set of subcarriers, and an additional set of bits to a third set of subcarriers;
        generate a signal according to a boosting factor based at least in part on mapping the first subset of bits, the second subset of bits, and the additional set of bits; and
        transmit the generated signal to the receiving apparatus.

20. The apparatus of claim 19, wherein the instructions are further executable by the processor to cause the apparatus to:
    apply the boosting factor to the first subset of bits and the second subset of bits, wherein the instructions, to map the first subset of bits to the first set of subcarriers and the second subset of bits to the second set of subcarriers, are executable by the processor to cause the apparatus to:

map the first subset of bits to the first set of subcarriers and the second subset of bits to the second set of subcarriers based at least in part on the boosting factor.

21. The apparatus of claim 19, wherein the instructions are further executable by the processor to cause the apparatus to:
   identify the third set of subcarriers as comprising an empty set; and
   scale the third set of subcarriers based at least in part on the boosting factor and a total energy of the generated signal.

22. The apparatus of claim 21, wherein the instructions are further executable by the processor to cause the apparatus to:
   perform noise coherence estimation for the generated signal using the third set of subcarriers based at least in part on the scaled third set of subcarriers.

23. The apparatus of claim 19, wherein the instructions are further executable by the processor to cause the apparatus to:
   encode the set of bits based at least in part on the boosting factor; and
   rate match the encoded set of bits based at least in part on the boosting factor.

24. The apparatus of claim 23, wherein the instructions, to encode the set of bits, are executable by the processor to cause the apparatus to:
   increase a rate of the encoding based at least in part on the boosting factor.

25. The apparatus of claim 19, wherein the boosting factor comprises a square root of a repetition factor.

26. The apparatus of claim 19, wherein the first subset of bits comprise a set of quadrature amplitude modulated (QAM) bits.

27. The apparatus of claim 19, wherein the instructions, to map the first subset of bits to the first set of subcarriers and the second subset of bits to the second set of subcarriers, are further executable by the processor to cause the apparatus to:
   map the first subset of bits to the first set of subcarriers and the second subset of bits to the second set of subcarriers based at least in part on a location of a data bit in the transport block.

28. The apparatus of claim 27, are further executable by the processor to cause the apparatus to:
   identify the location of the data bit based at least in part on an index modulation scheme associated with the first subset of bits and the second subset of bits.

29. The apparatus of claim 28, wherein the index modulation scheme comprises a Gray index modulation scheme.

30. The apparatus of claim 19, are further executable by the processor to cause the apparatus to:
   add a number of index modulation bits to the second set of subcarriers in accordance with the mapping, wherein the number of index modulation bits is based at least in part on a logarithmic operation on the boosting factor.

* * * * *